March 19, 1968 — A. BROTHMAN ETAL — 3,374,464
SUPERVISORY CONTROL SYSTEM
Filed Jan. 8, 1965 — 20 Sheets-Sheet 2
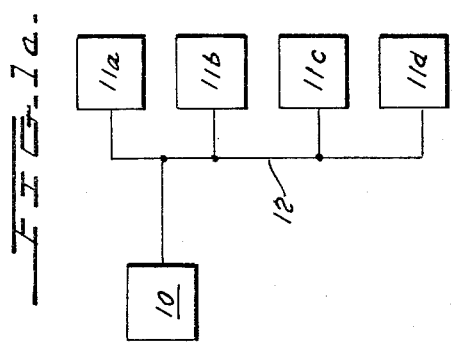
INVENTORS
ABRAHAM BROTHMAN
LEE HOROWITZ
MICHAEL GOMERY
CONRAD YANIS
OSTROLENK, FABER, GERB & SOFFEN
ATTORNEYS

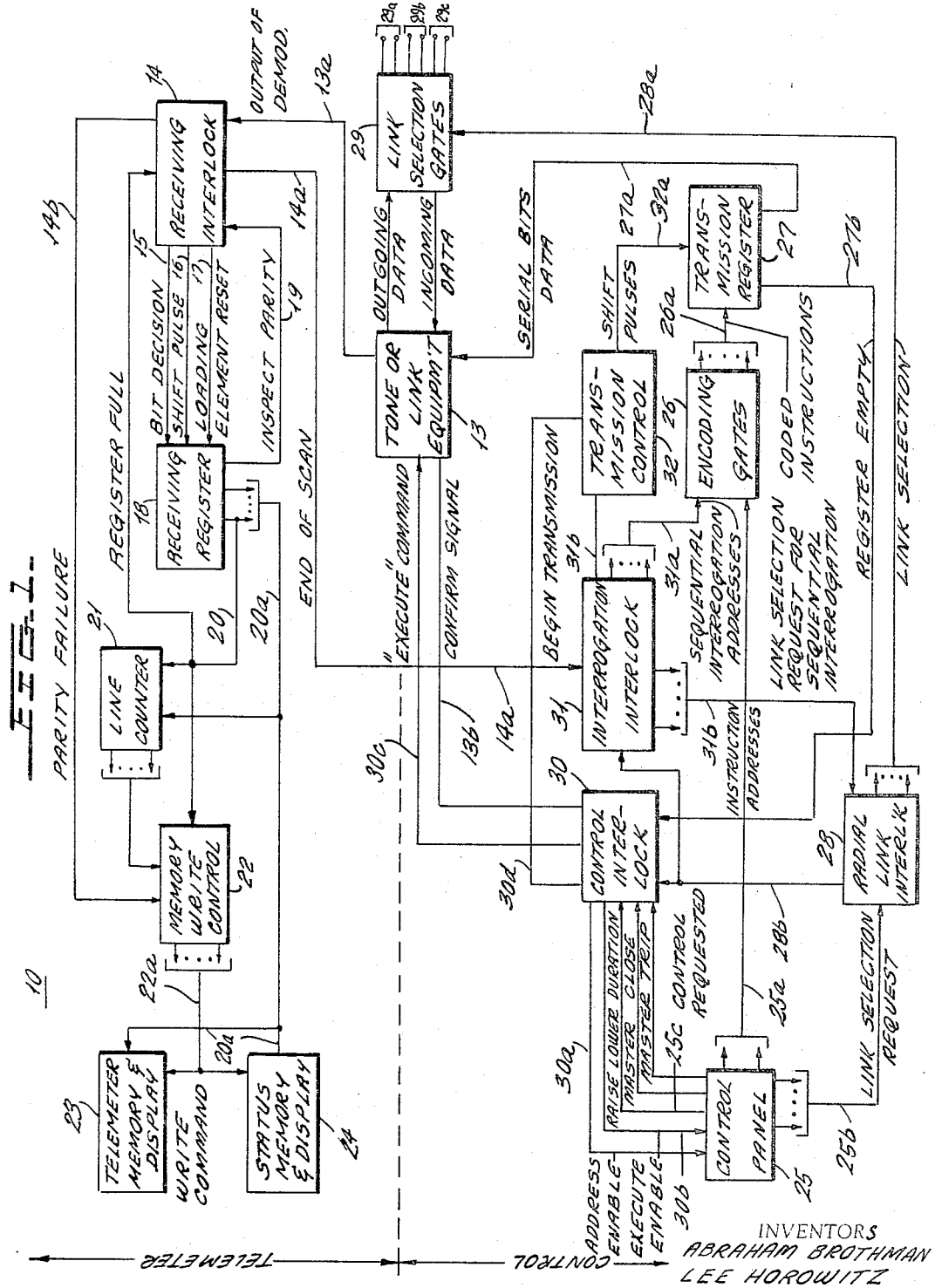

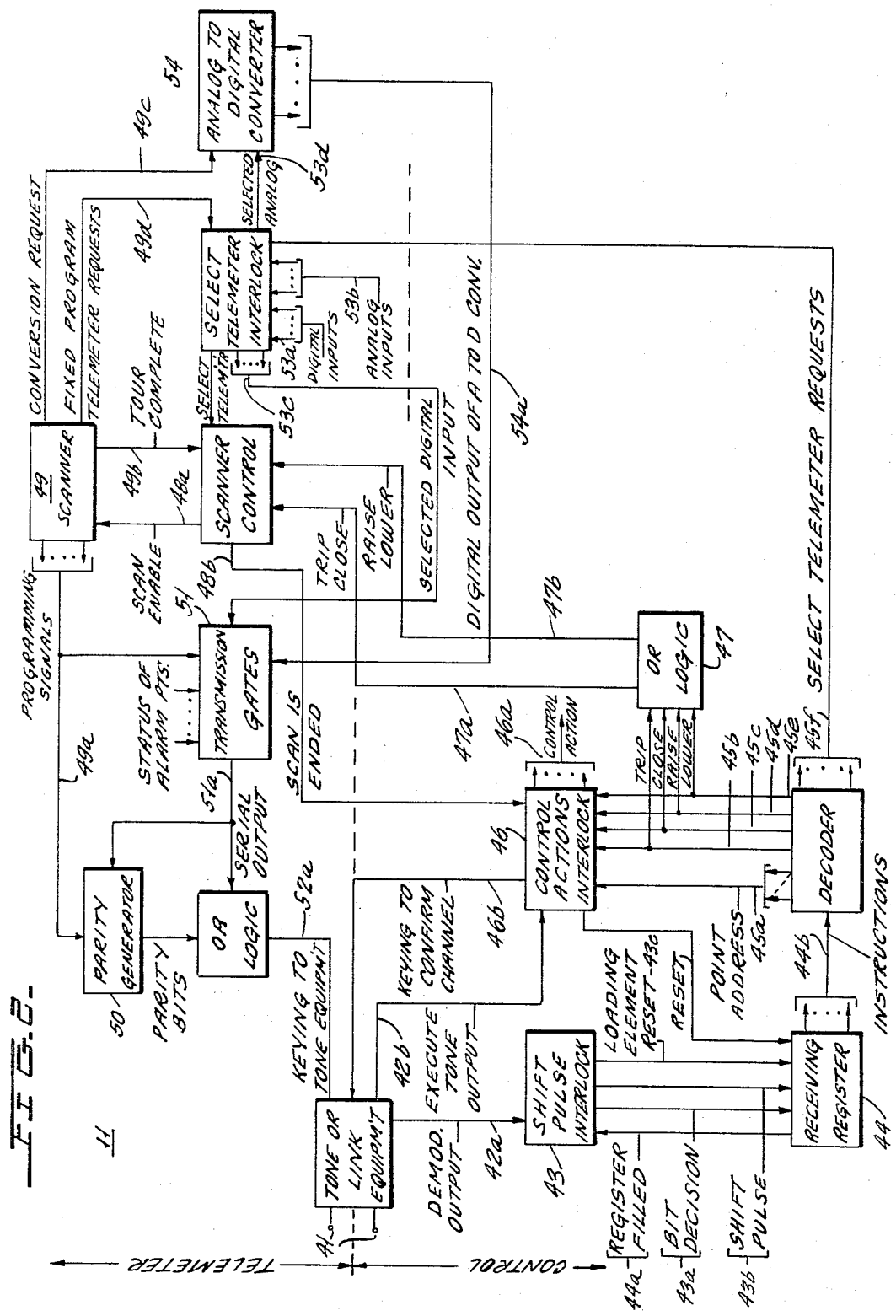

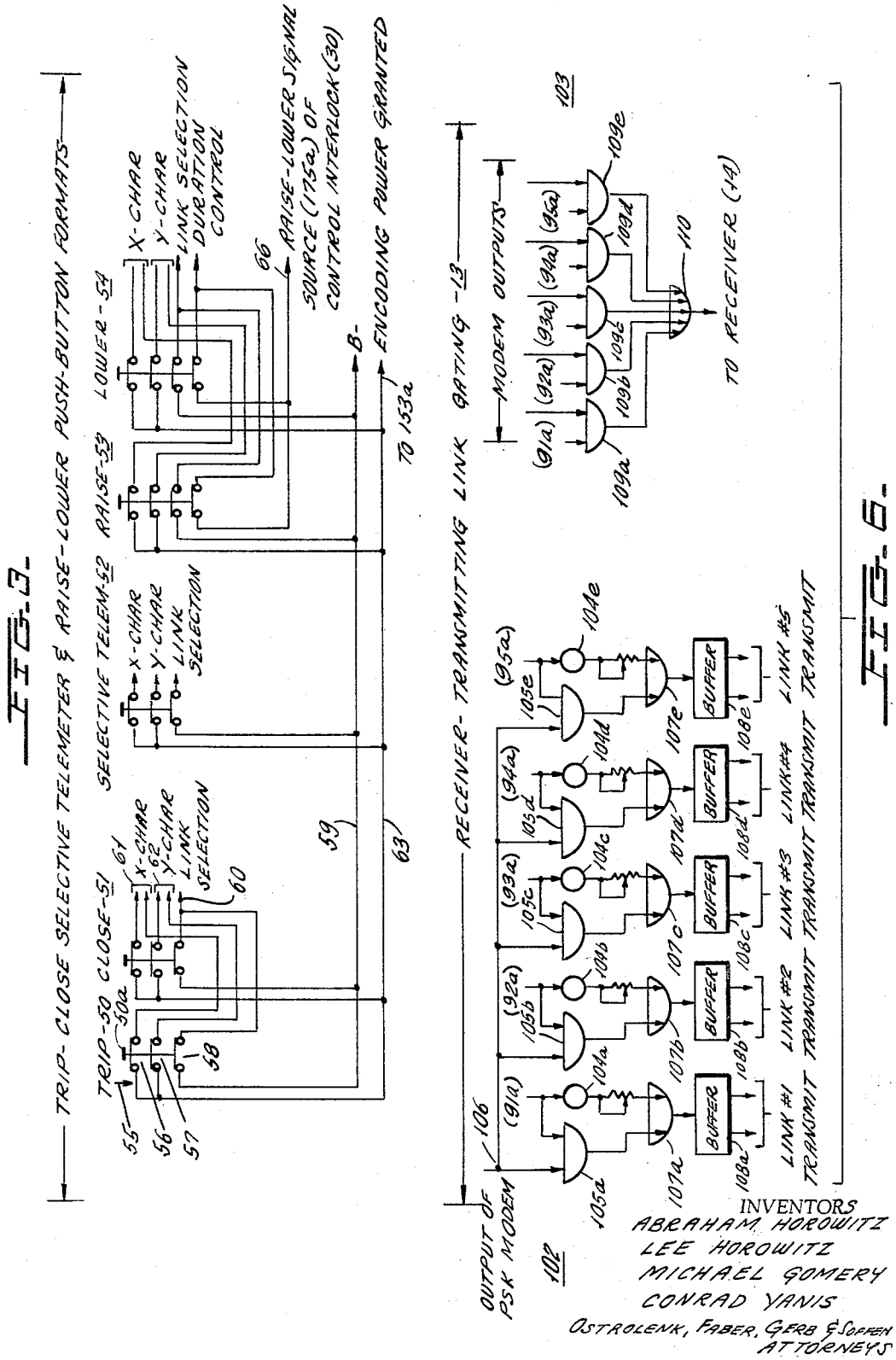

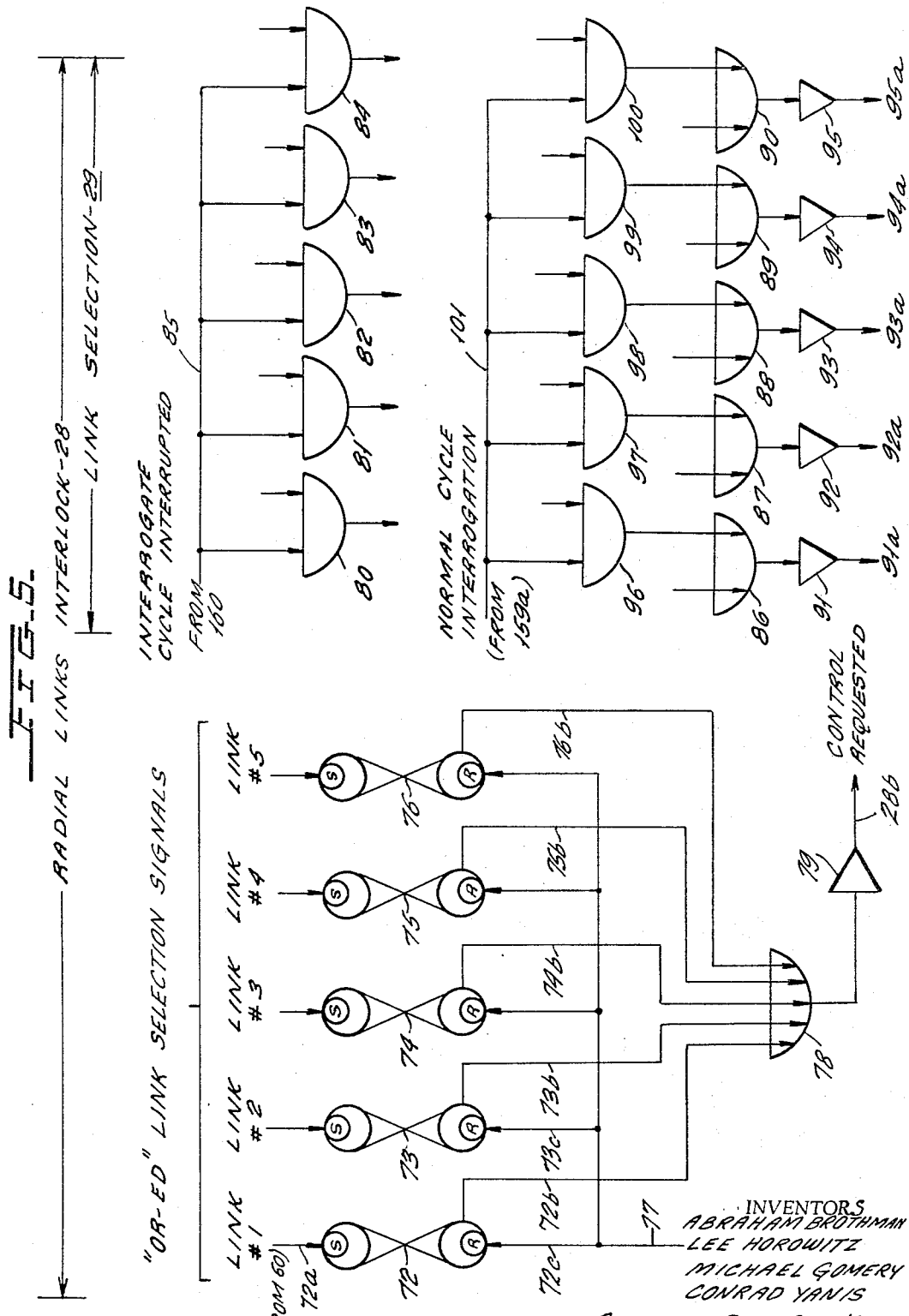

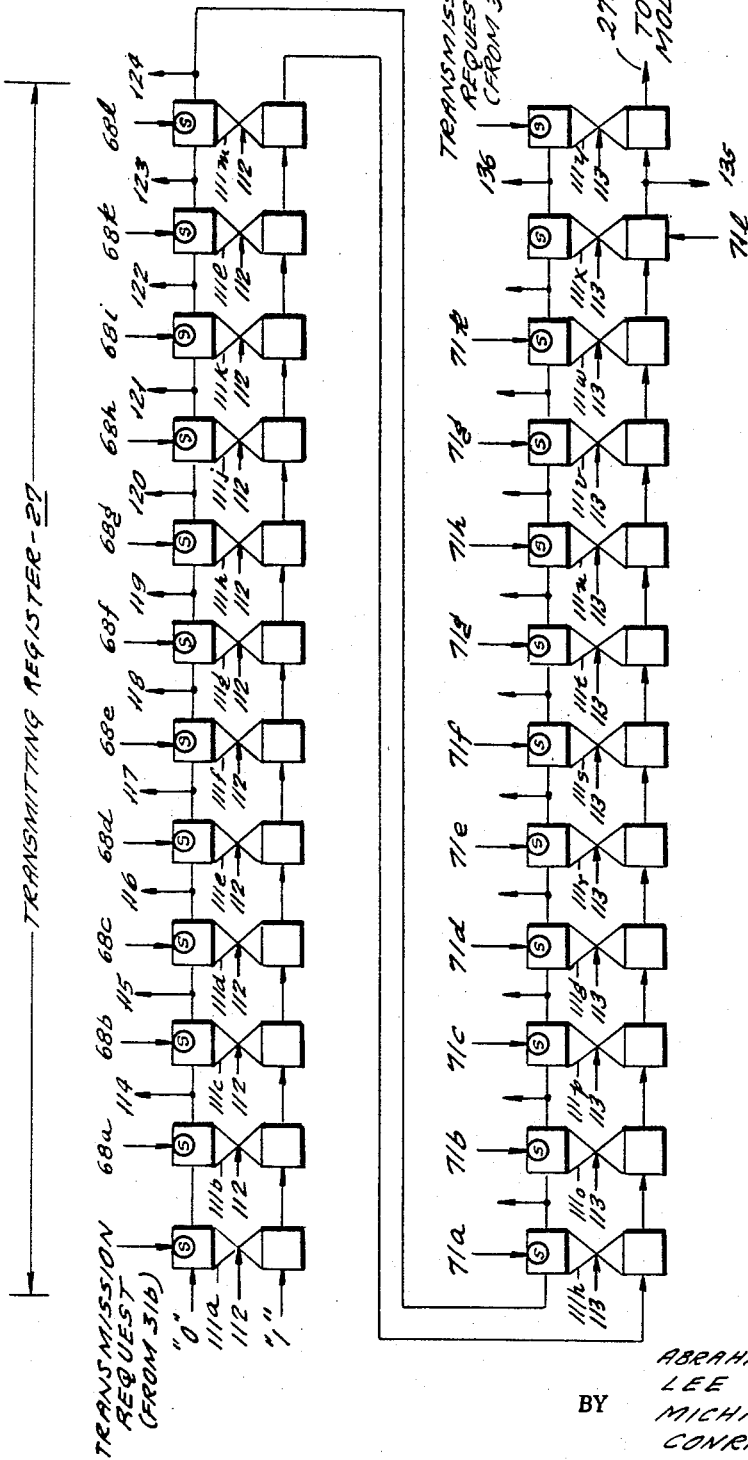

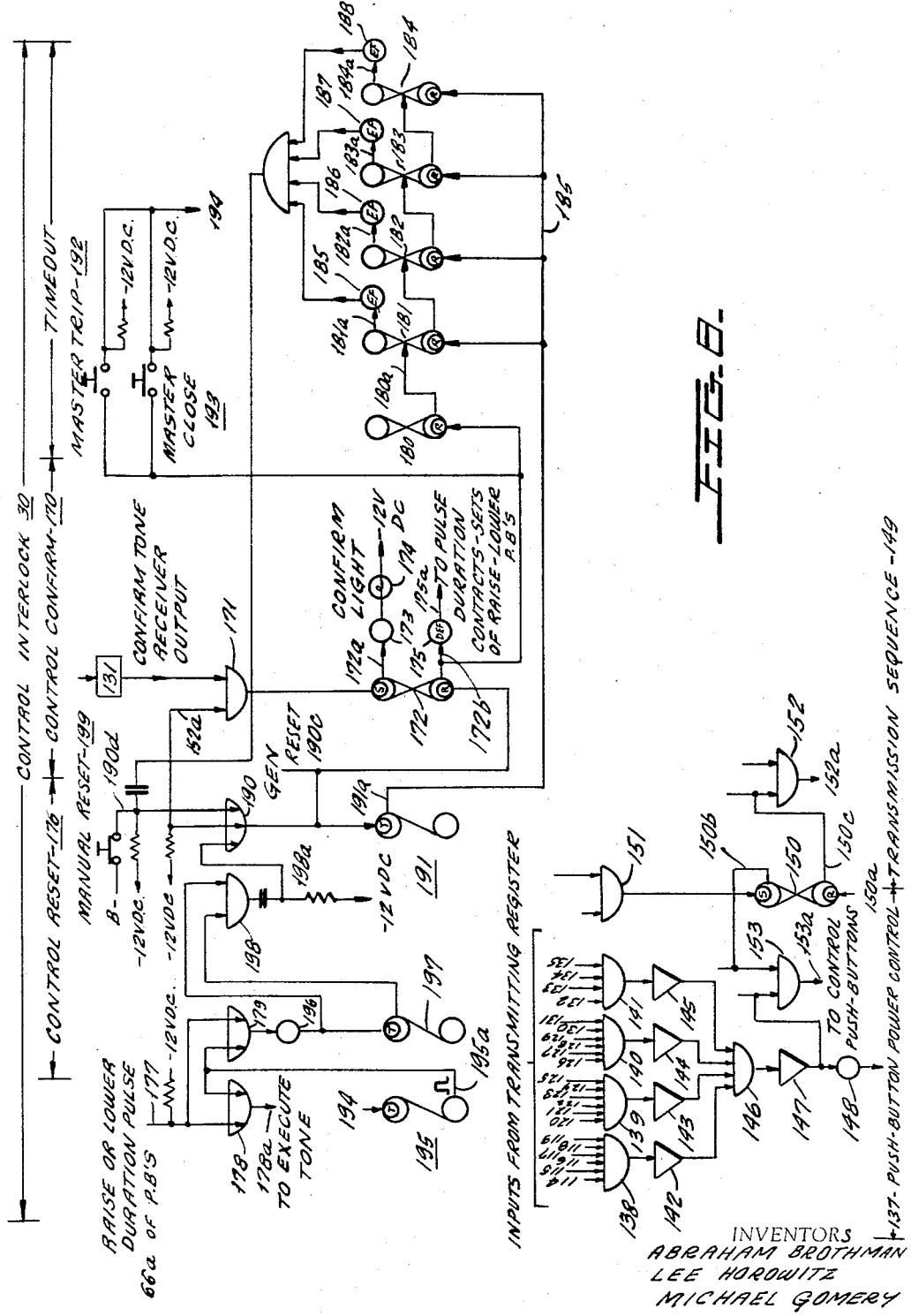

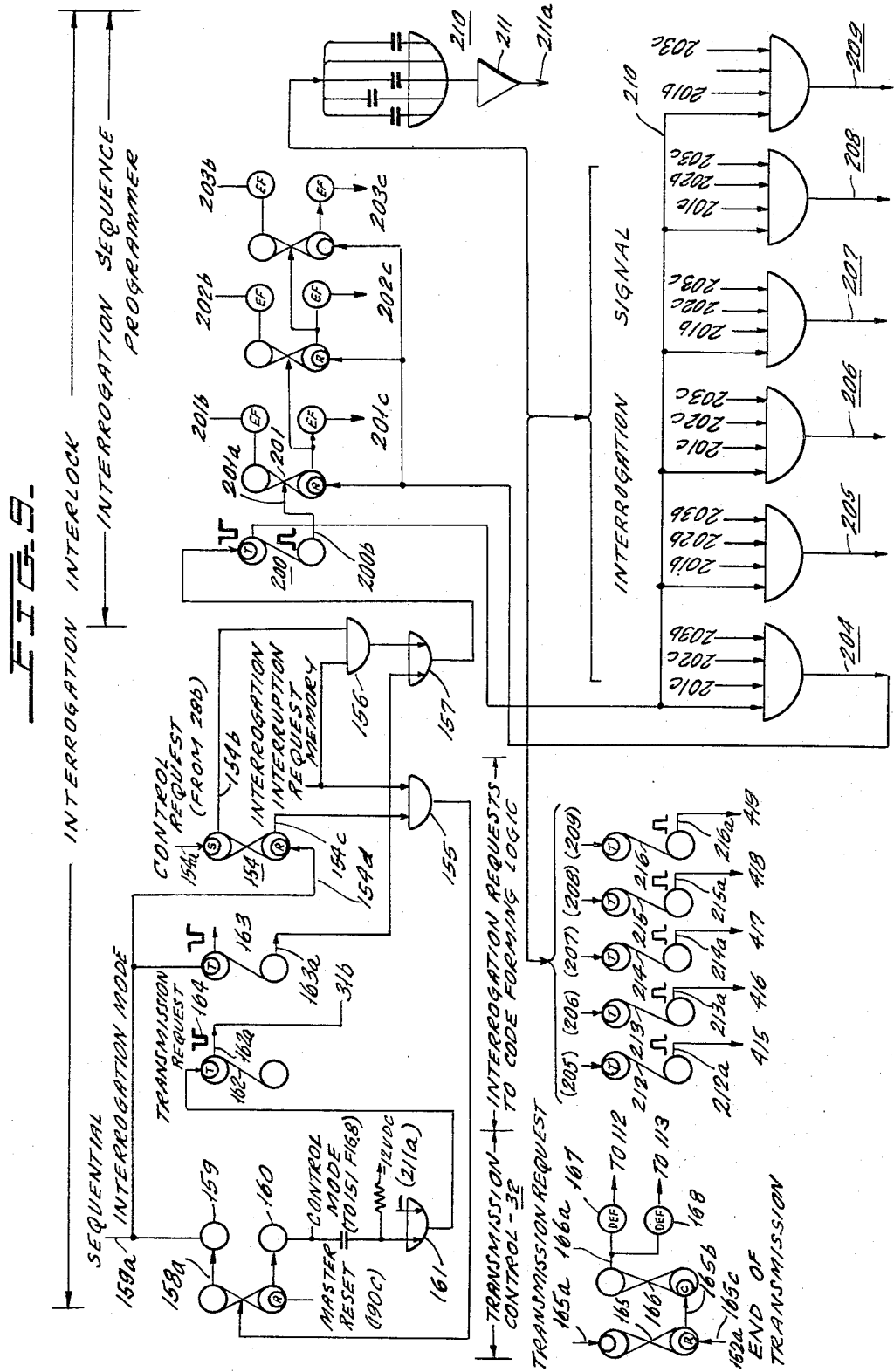

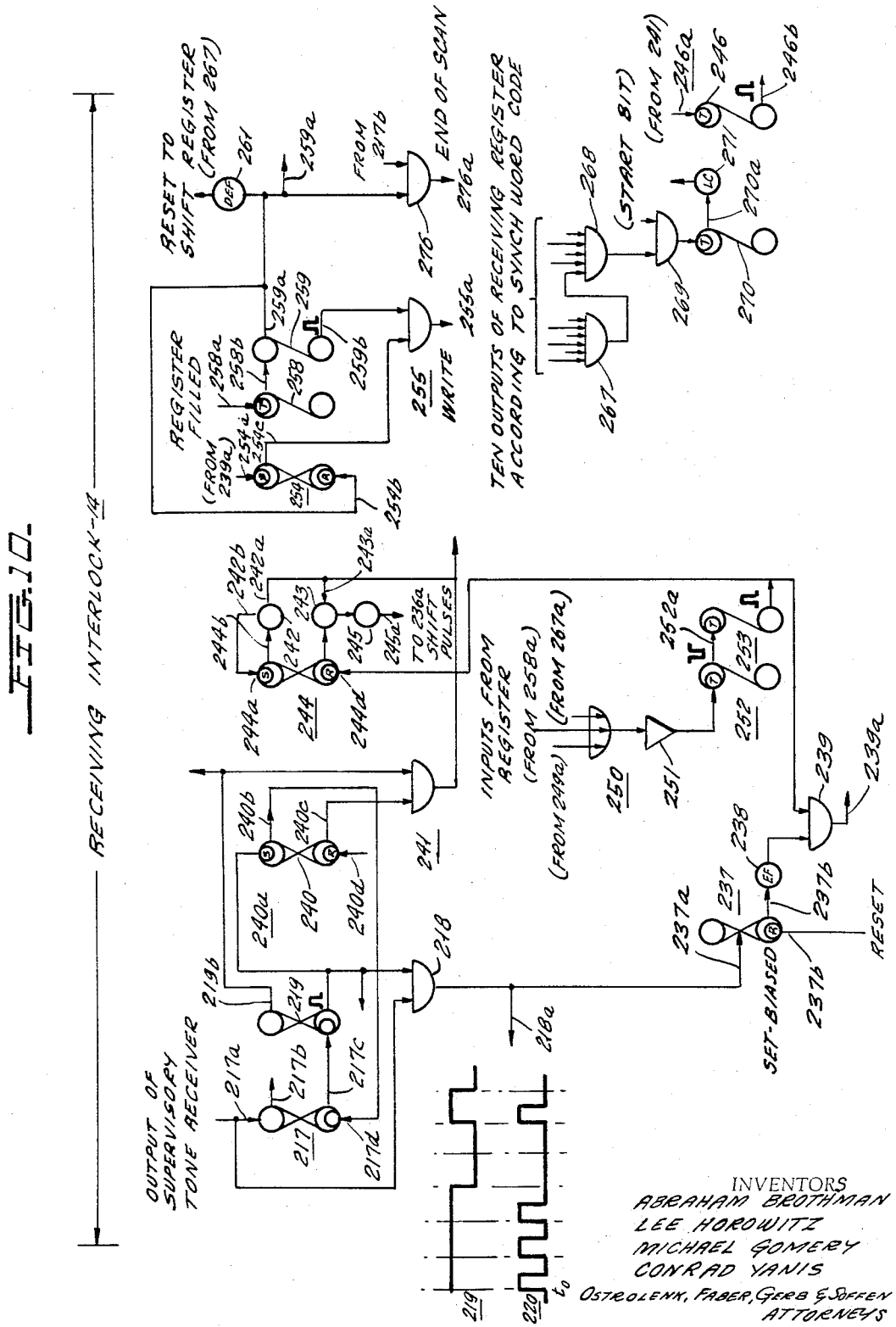

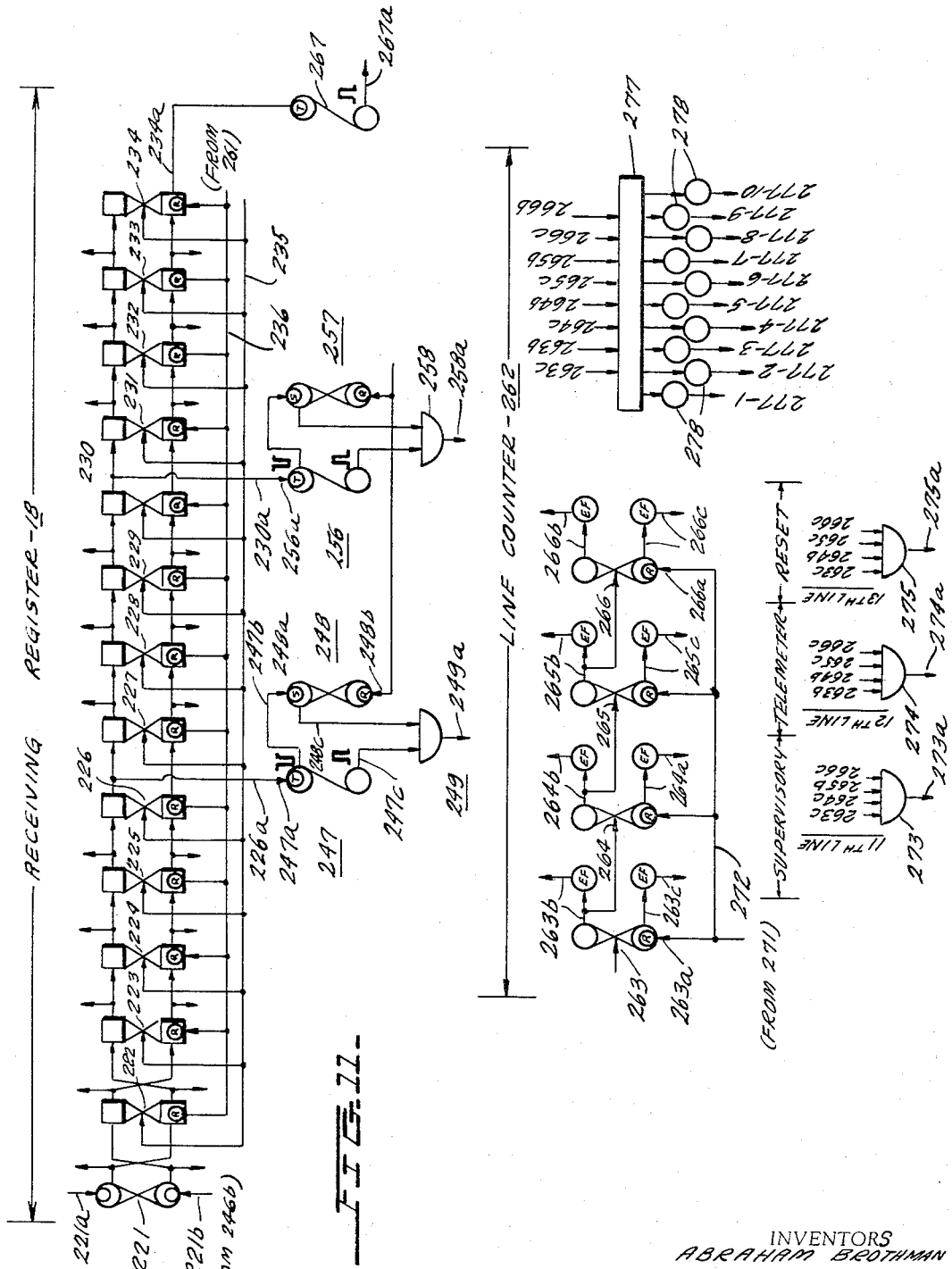

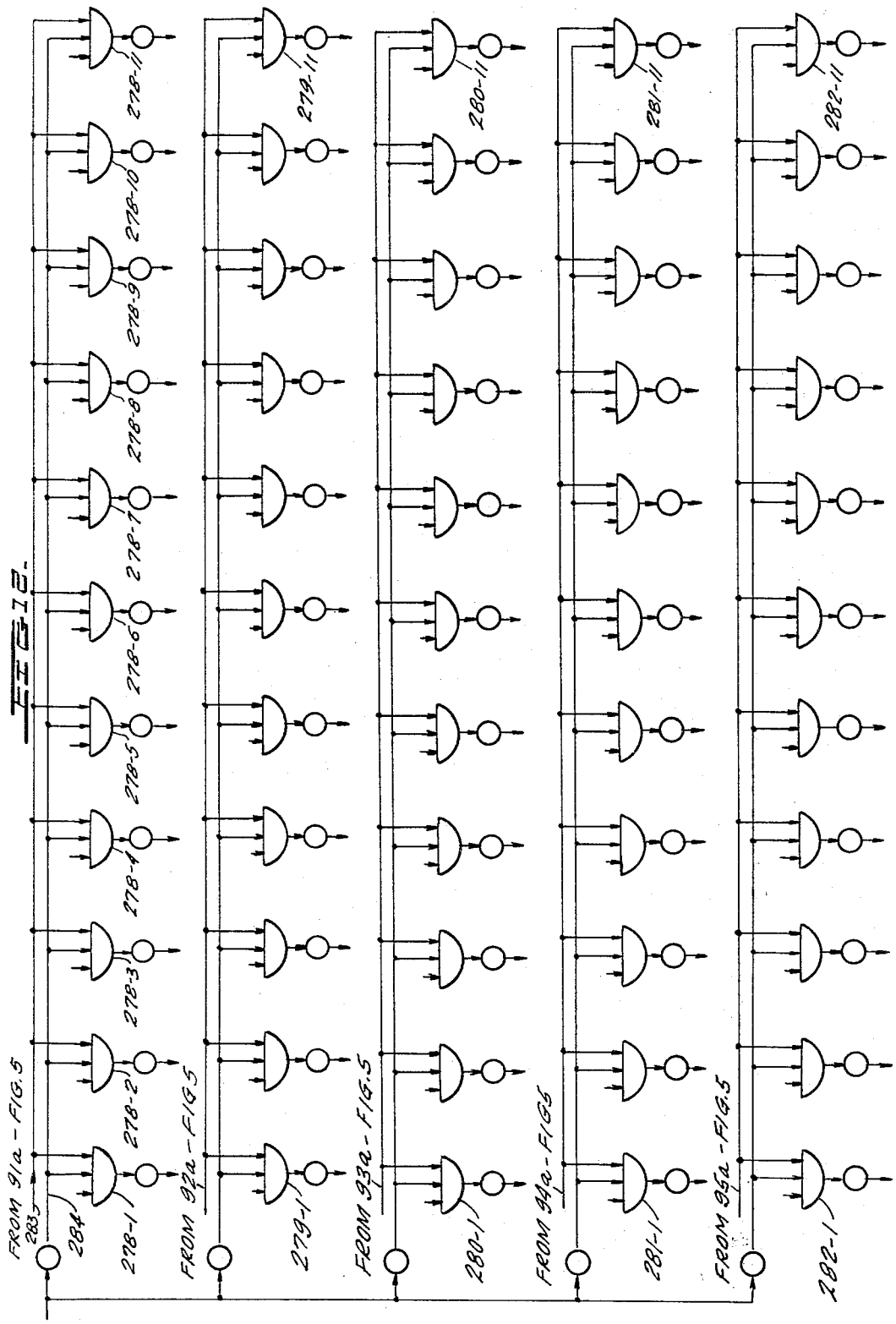

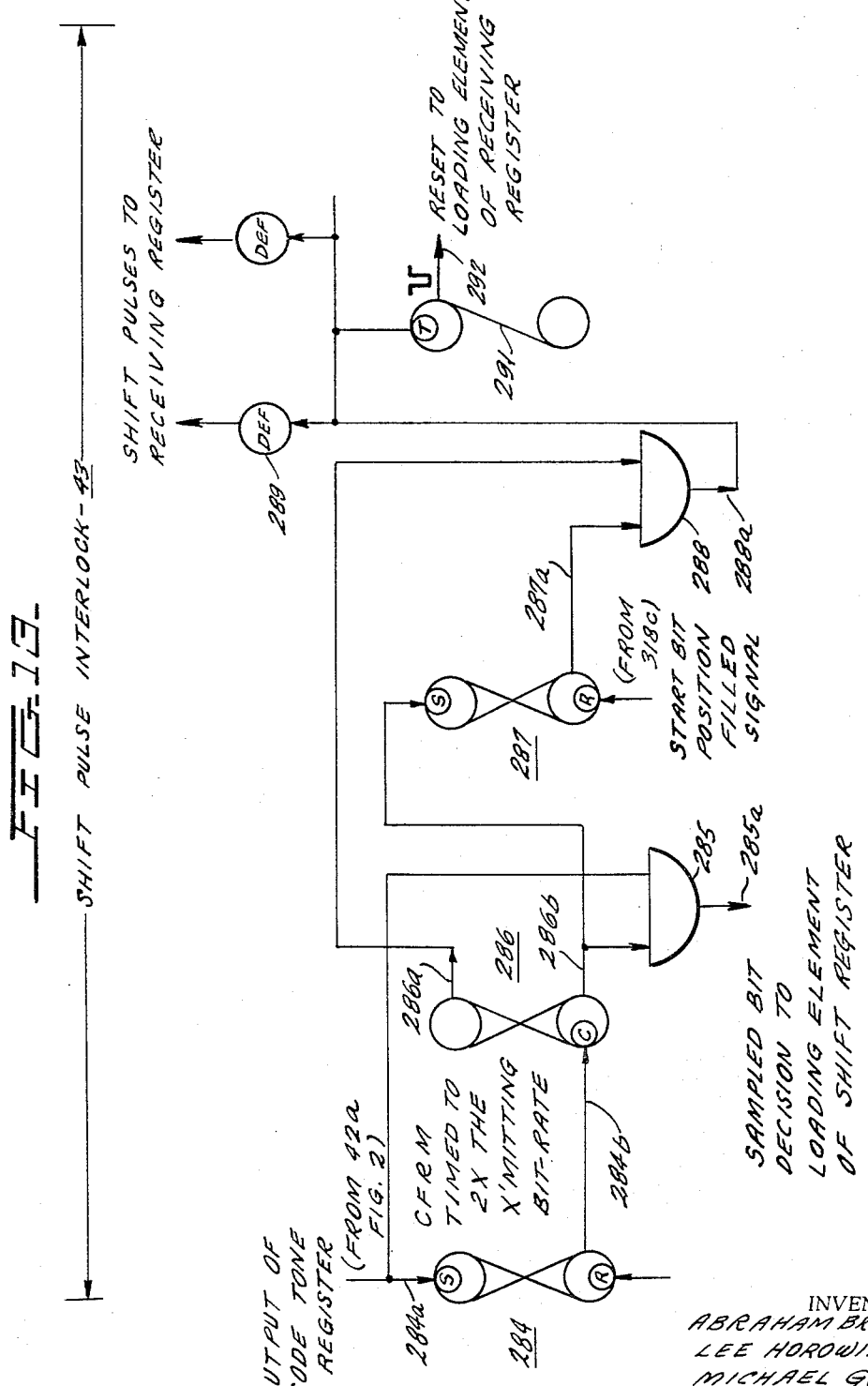

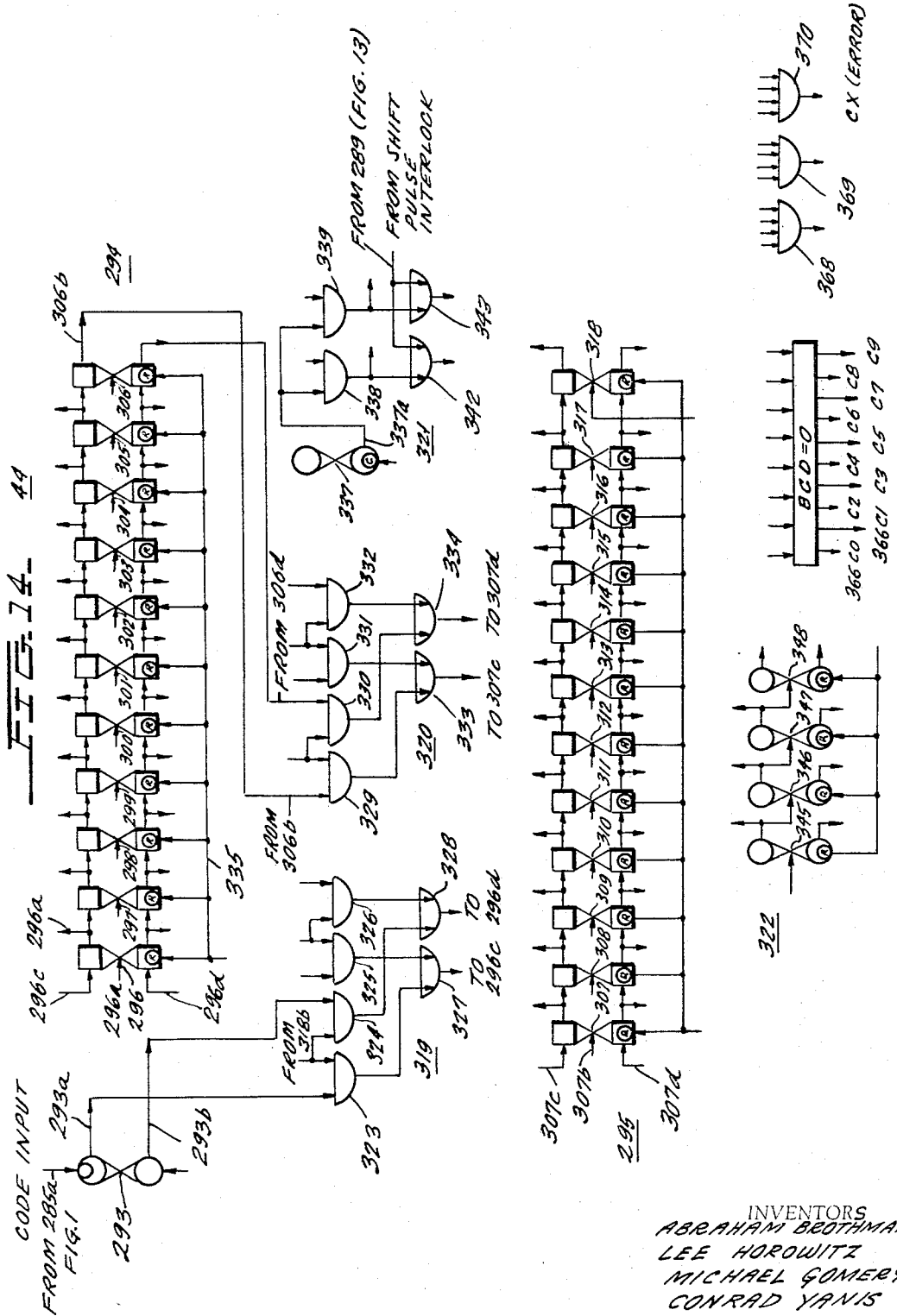

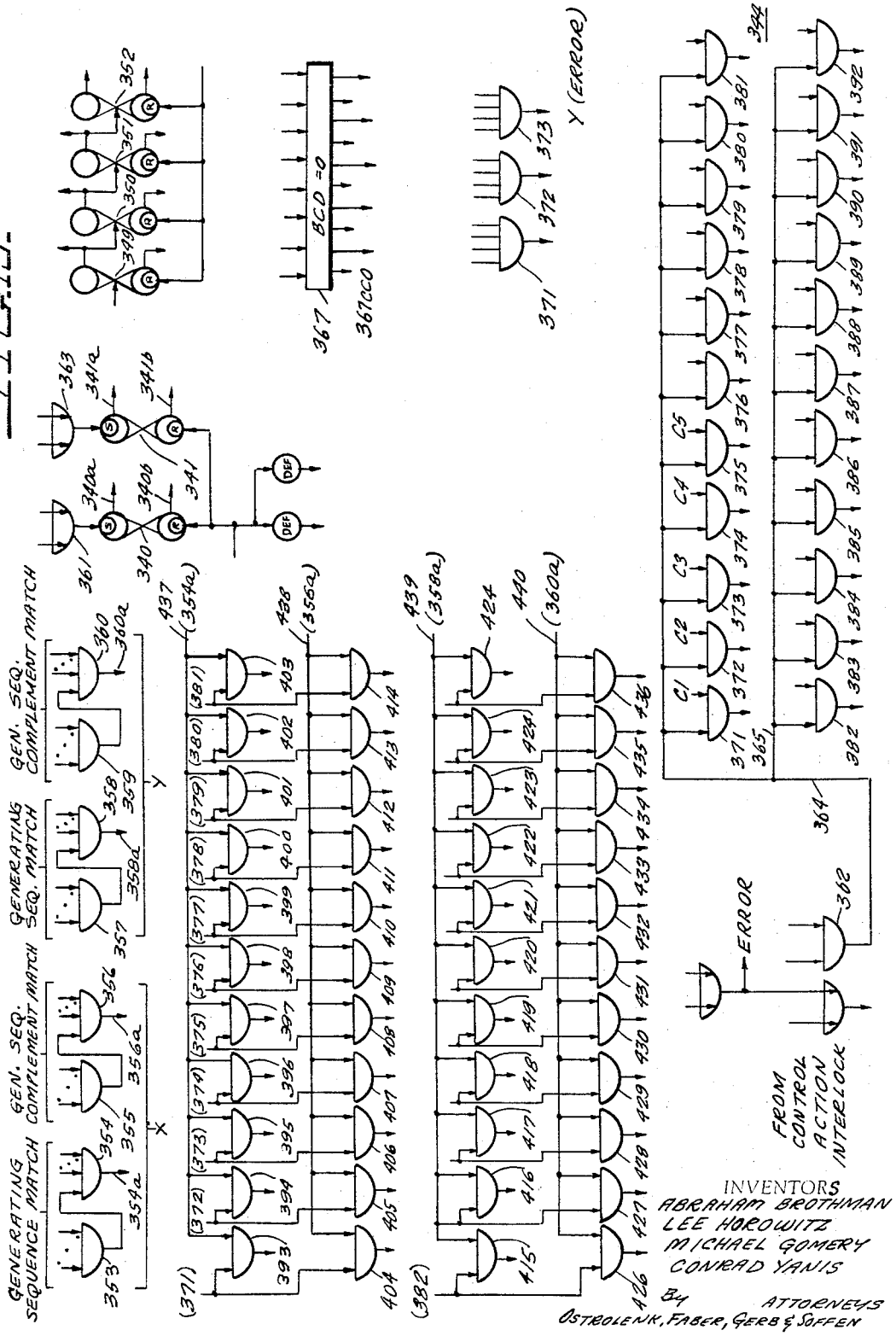

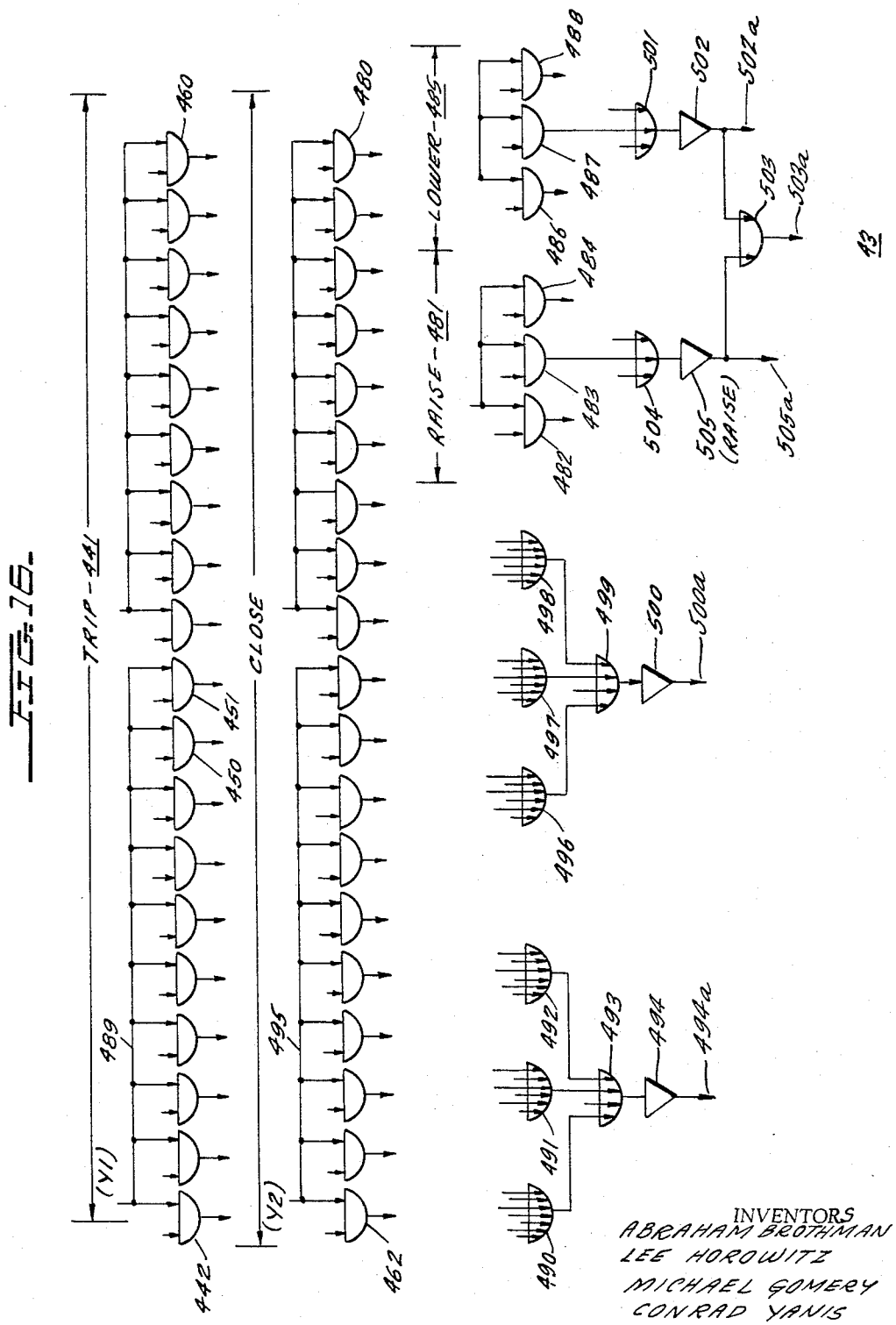

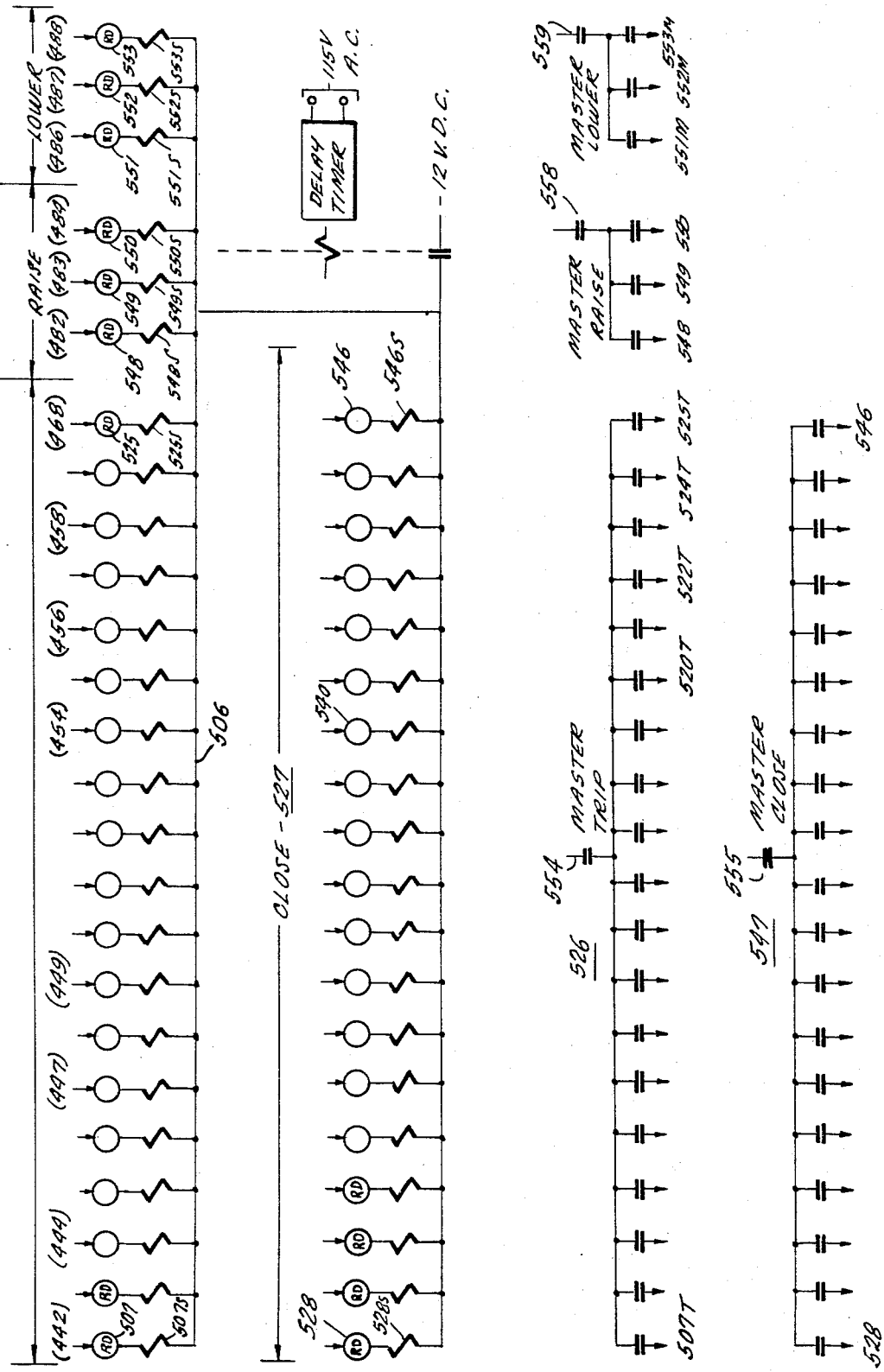

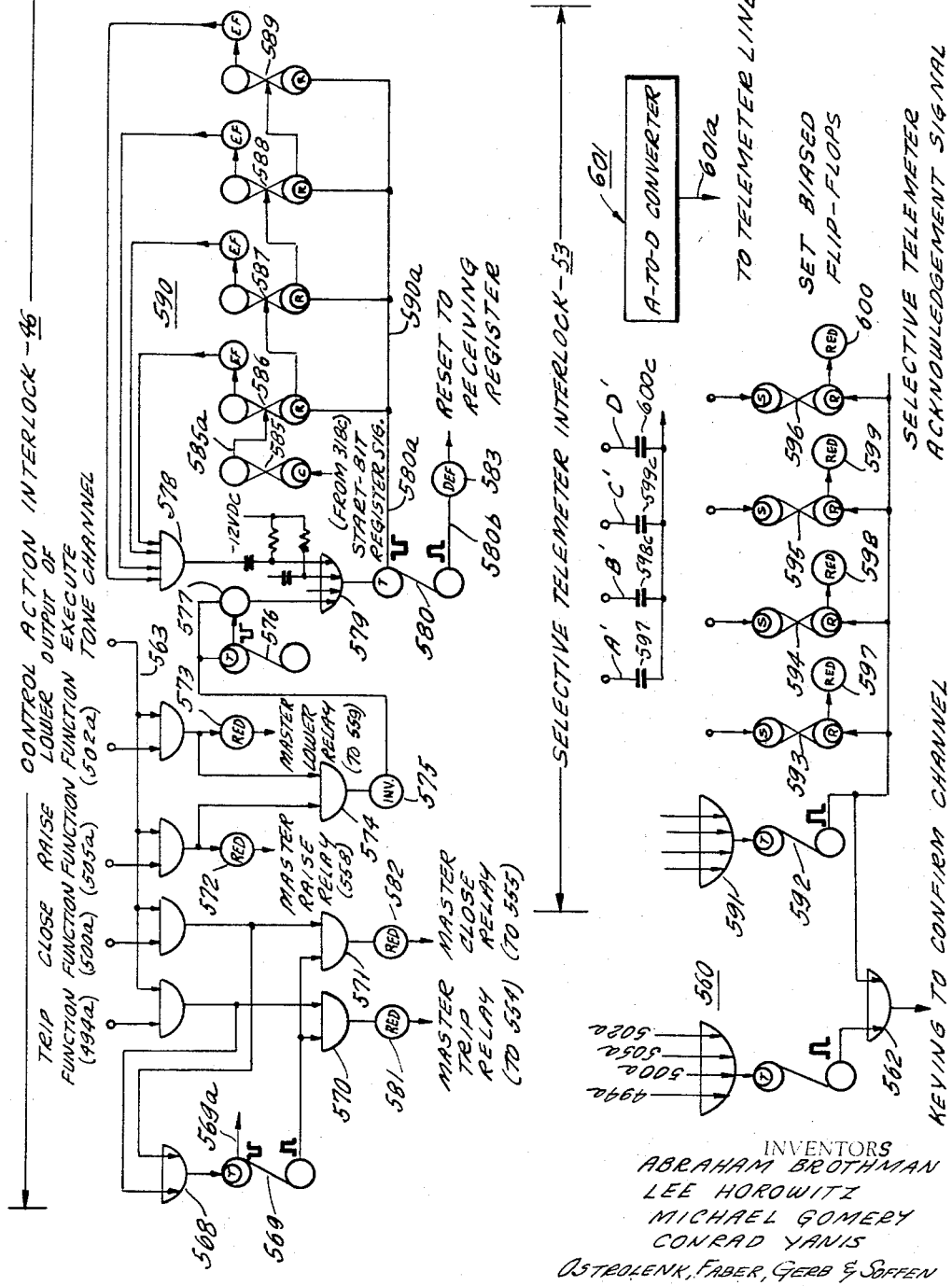

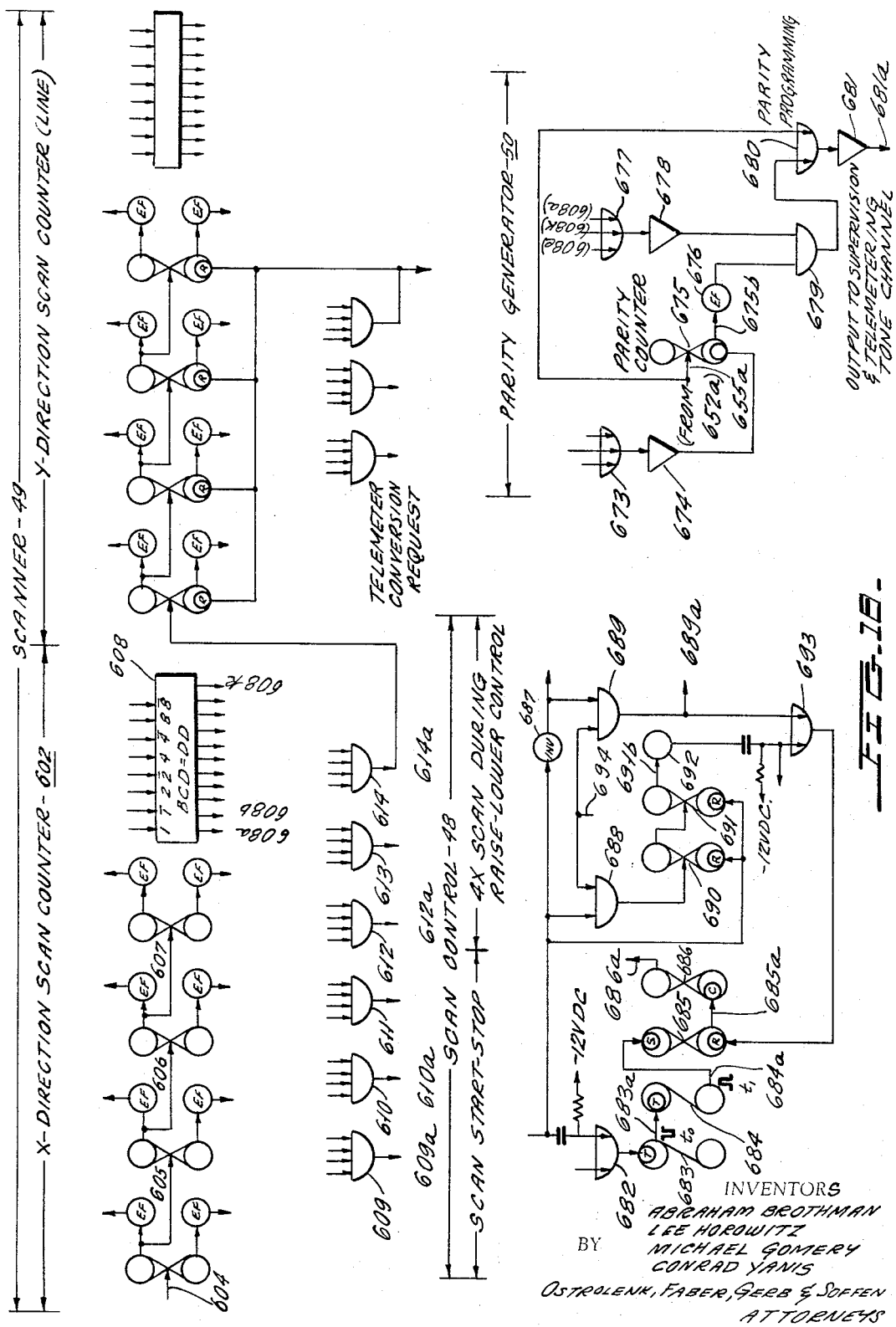

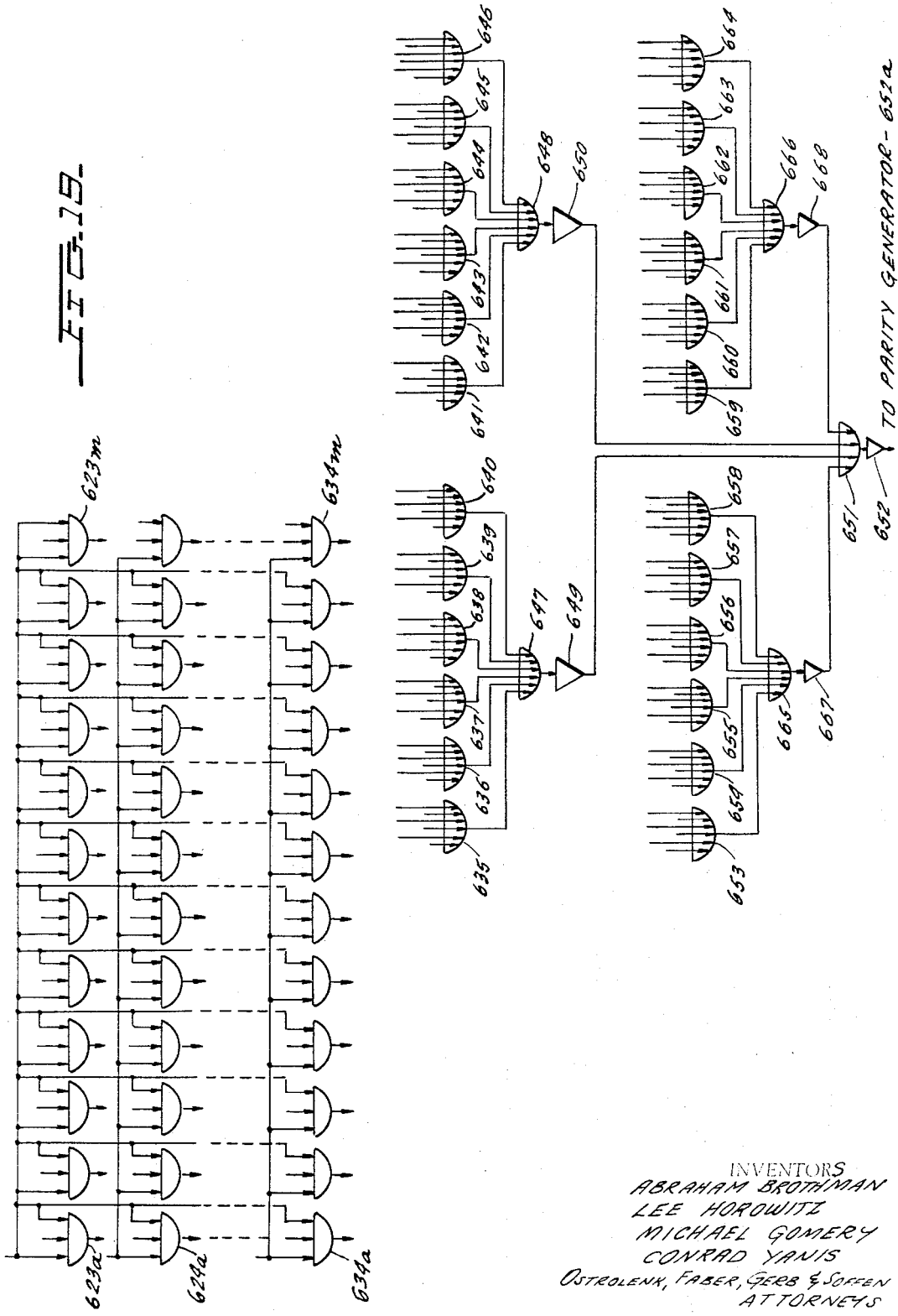

United States Patent Office 3,374,464
Patented Mar. 19, 1968

3,374,464
SUPERVISORY CONTROL SYSTEM
Abraham Brothman, Dumont, Lee Horowitz, Cedar Grove, Michael Gomery, Saddle River, and Conrad Yanis, Glen Rock, N.J., assignors, by mesne assignments, to Sangamo Electric Company, Springfield, Ill., a corporation of Delaware
Filed Jan. 8, 1965, Ser. No. 424,348
23 Claims. (Cl. 340—172.5)

ABSTRACT OF THE DISCLOSURE

This invention teaches a supervisory control system for gathering a variety of different types of information at a central data gathering point from a plurality of remote points within a system. The system is comprised of a central data gathering point and at least one remote location. Each remote location has concentrated thereat a plurality of data points for which it is desired to transmit telemetry, On, Off, Open or Closed and other varieties of information to the central data gathering point.

Quiescent operation of the system is such that the central data gathering point selects a particular remote location and transmits a transmit request signal. The remote location, upon receipt and recognition of the transmit request signal, first transmits an acknowledge signal confirming the receipt and/or authentication of a transmit request signal, which is followed by the information desired as to the status of each data point in the data bank for that remote location. After all data points at that particular remote location have been scanned and their status reported to the central data gathering point, an off-line signal is transmitted indicating to the central processing center that all points have been scanned, enabling the central location to scan data points of the next remote location. Scanning in this nature continues until all remote locations have been scanned, at which time the cycle begins anew.

If it is desired to reach a particular data point at any given remote location, control of the system may be seized by manually operable means wherein the particular remote location and the particular point at the selected remote location is selected at the central location. Operation of these controls causes the quiescent state to be interrupted upon completion of the scan at the remote location transmitting at that time and the system is then placed under control of the manually operable controls which have been enabled.

In order to reach a particular data point contained within a bank of points at the selected remote location, the central location transmits a binary word to the selected remote location. This binary word is fed into a shift register at the selected remote location. As soon as the word is loaded into this shift register, the shift register is divided into two parts each of which is then coupled to form a closed loop. Operation at the selected remote location to determine the data point whose status is desired begins by shifting the loaded data word received from the central location through the two shift registers one bit position at a time. Gating means coupled to selected outputs of both the first and second shift registers are employed to sense the order of the data bits in the first and second shift registers. Recirculation of the code word within the two registers continues until the gating means acknowledges the fact that valid code word identifying one particular data point (i.e., the selected data point) is appropriately arranged in the first and second registers. At this point the gating means terminates the circulation of the code word in the registers.

Counting means are provided for counting the total number of shift operations performed. The total count is employed for the purpose of addressing the particular data point to be selected. The code word transmitted by the central location to the remote location sets up only one valid code word for the data point selected regardless of how many shifts may be performed and no other valid code words will be set up as a result of receipt and circulation of this code word.

In the case where the status of the addressed data point is desired, as soon as the validity of the code word is established, this information will be transmitted to the central location. The transmitted code word may contain further information identified by the remote location requesting control over the particular data point addressed. For example, if the data point contains status as to the liquid level in a tank and upon receipt of that status, it is desired to raise or lower the level, the code word will further identify the fact that control over the data point is desired and manual control may be exerted at the central location to raise or lower the level to a desired value. Control may be relinquished by a suitable signal transmitted from the central location to the remote location. As soon as the status and/or control over the selected data point is completed the system returns to its quiescent state of operation.

---

The instant invention relates to communication systems, and more particularly to supervisory control systems for gathering a variety of different types of information, located at remote stations, at a central or master station, and further having the capability of interrupting the normal data gathering process for supervision and/or control of a given point any time that such interruption is desired.

Numerous industrial applications require the monitoring or supervision of a large number of points in order to adequately survey the system, establish its condition, and make any necessary alterations or adjustments of system parameters to insure optimum system operation. As one typical example, in power distribution networks it is extremely important as well as being helpful to be able to ascertain the condition of every circuit breaker within the network. This information would take the form of simple binary or two-state information, i.e., open or closed.

Other information available in such power distribution networks are instrument readings which may, for example, be readings of current, voltage, watts, vars, power factor, and the like. Other possible readings are kilowatt-hour readings such as are generated by meter registers such as watt-hour meters. All of these readings may be either electrically or electro-mechanically converted into binary form for transmission from remote locations to one central or master location. Due to the fact that the status of the points within a network being monitored are large in number and are continuously subject to change, it is important that all of the points within the system be continuously scanned at a sufficiently frequent rate in order to establish any changes at system points as soon after their occurrence as possible.

In certain instances, it is desired to obtain access to a particular point for supervisory and/or control purposes. For example, during the process of system scanning, it may be desired or even required to establish the condition of a point which is not at present being monitored. Access to such a point may be for the purpose of supervision only, or for the further purpose of exercising control over the remote point.

The system of the instant invention provides the capabilities above mentioned in an arrangement which further has novel means for establishing identification of a received code in order to establish connection between a remote station and the central or master station.

The instant invention is basically comprised of a master station and at least one remote station with the total number of remote stations being dependent upon the system requirements. In its quiescent state the master station is provided with means for receiving data from the remote station, establishing the bit condition of incoming data, loading the data into a receiving register and connecting the data so examined to telemetry or status display devices or to other suitable output utilization devices such as recording devices of the paper-tape, magnetic tape and Flexowriter form; or directly into data processing or computer-type utilization devices. The total amount of data from the remote station is predetermined by system design, and when all the data has been received from this remote station, a new scan from the remote station may then begin. In applications where a plurality of remote stations are utilized, the master station, upon receipt of the last line of data from the remote station, will automatically transmit the call code of the next remote station to be interrogated. After confirmation, upon receipt of the remote station call code, this remote station will play out all of its data to the master station, and each remote station will operate in turn until all such remote stations have scanned each point for which it is responsible, at which time a completely new scanning cycle will begin, starting again with the very first remote station.

In addition to the capability of receiving data at the master station during its quiescent state, the master station is provided with means for exercising manual control over the remote station which monitors the particular point which the operator desires to address. Means are provided for selecting a particular remote station at a particular point at that remote station comprising a push-button panel which, when selectively depressed, generates a binary code which is designed to identify the remote station, the particular point at the remote station and the form of supervision and/or control which the operator at the master station wishes to exercise over the desired point. Upon completion of the scan at the slave station at that given instant, the manual operation performed to obtain control of the master station becomes operative so as to interrupt the quiescent operation of master station and slave stations and to transmit the identifying slave station and address of the desired point.

Each slave station receives the address of the point desired to be reached and loads the address into novel register-decoder means. When the identifying code is fully loaded into the register-decoder means, the register is converted into a plurality of shift registers, each of which closes in upon itself. A count is generated of the number of times which the portion of the identifying word in each register portion is shifted until a valid code for the remote register is properly positioned therein. When this occurs, the cumulative count within each counter means associated with each recirculating register acts as the means for establishing which point at the slave station is intended to be addressed. The decoding operation is then employed to transmit a confirmed signal back to the master station indicative of the fact that a valid remote station address has been received and processed and that the remote point is presently being addressed. In the case where telemetry information is involved and a raise or lower control is to be exercised over the addressed point, the remote station scans all of its points a plurality of times during the period in which the raise or lower control function is being exerted. The point over which control is to be exerted will have its reading displayed on the master station display panel. The desired change at the point being displayed occurs under the control of the master through a transmitted "execute" tone. In the case where a trip or close operation is to be performed, the operation is performed by means of the same execute tone transmitted from the master to the remote station.

In the case of a selective telemeter request, selected information such as meter readings and the like, which may be in analog form or in digital form, are transmitted to the master station for display thereat. In the case where the select telemeter request is for analog readings, the data is first imposed upon analog to digital converter means so that it may be transmitted in digital form to the master station.

In the case where a raise or lower operation is to be performed, the confirmed signal from the remote station back to the master must first be received before the raise or lower operation can be executed. Once the confirmed signal is received, the raise or lower operation is then enabled and is transmitted in the form of a continuous tone frequency, the duration of which establishes the amount of raising or lowering which takes place.

In order to protect the device over which raise or lower control is being exerted, counting means are provided to time the maximum duration during which either the raise or lower control may be executed. This value may be set to any desired time duration. Upon the receipt of any telemetry information, either during a selective telemetry request or during a raise/lower operation, the digital information received is checked for validity by means of a parity inspection, and upon proof of validity, is inserted either upon the master station display means or into any suitable storage or computation means.

During quiescent operation of the system, i.e., at times other than those at which a manual operation is performed to obtain control at the master, each remote station scans all of the points electronically associated with the remote station, and transmits this information to the master station so as to continuously update the data with each sweep of the remote stations in the system. In the case of telemeter information, numeric characters are transmitted as four binary bits plus sign. In the case of alarm points which are either in one of two states such as open or close, on or off, etc., in order to increase the reliability of transmission, the parity bit is inserted after every group of four binary bits of alarm point information, since the master station knows the total number of points which each remote station contains. By maintaining a count of the number of lines of data received from each remote station, the master station is thereby automatically enabled to establish the end of transmission time for each remote station, and thereby generate identifying code for the next remote station to scan its data and transmit data to the master station.

Thus, the system in its quiescent state is continuously updating the system data without the need for exerting any control whatsoever over the system. And, at any desired time, regardless of which remote station may be on line, and regardless of the point at which the scan being performed at any given instant may be located request for control is instantaneously initiated and is automatically obtained upon completion of the end of scan from the remote station or line, and the address of the desired point is then automatically transmitted. Each remote station, which has its own particular identifying code, simultaneously ascertains its own identifying code and establishes the point at the remote station to the address by processing the identifying code in a register decoder means provided with separate recirculating portions, each having counter means affiliated therewith.

It is, therefore, one object of the instant invention, to provide novel supervisory control means for use in gathering data from a plurality of remote points at a central location.

Still another object of the instant invention is to provide novel supervisory control means for gathering data from a plurality of remote points at one master location wherein the master station is further provided with means for exercising control over selected remote points when desired.

Still another object of the instant invention is to provide novel supervisory control means for gathering data from a plurality of remote points at one central location and having a quiescent state of operation in which data is regularly transmitted from the remote point in repeating cycles during the quiescent state of operation of the supervisory control system, and having means for interrupting the quiescent state of operation at any given time in order to exert control and/or obtain telemetry information from any remote point within the system.

Still another object of the instant invention is to provide novel supervisory control means for use in gathering data from a plurality of remote points at one central location wherein the remote points affiliated with a remote station are addressed through novel recirculating-type decoding means provided at each remote station.

Still another object of the instant invention is to provide a novel supervisory control system for use in gathering information from a plurality of remote points at a given central location having a quiescent state of operation where all of the remote points are continuously scanned in regular cycles in order to update the system data having means for exercising control over any selected remote point at any given instant wherein such control may not be exercised until the remote station provides an acknowledge indication that it has decoded its identifying code.

These and other objects of the instant invention will become apparent when reading the accompanying description and drawings, in which;

FIGURE 1 is a block diagram showing a master station designed in accordance with the principles of the instant invention.

FIGURE 1a is a block diagram showing the manner in which the system is connected.

FIGURE 1b shows a typical control panel section employed in the master station of FIGURE 1.

FIGURE 1c is a chart showing the binary cyclic code employed in the system of the instant invention.

FIGURE 2 is a block diagram showing a remote or slave station designed in accordance with the principles of the instant invention.

FIGURES 3–13 are logic diagrams setting forth the components of the master station of FIGURE 1 in greater detail.

FIGURES 14–19 are logic diagrams showing portions of the slave station of FIGURE 2 in greater detail.

Figure 4:
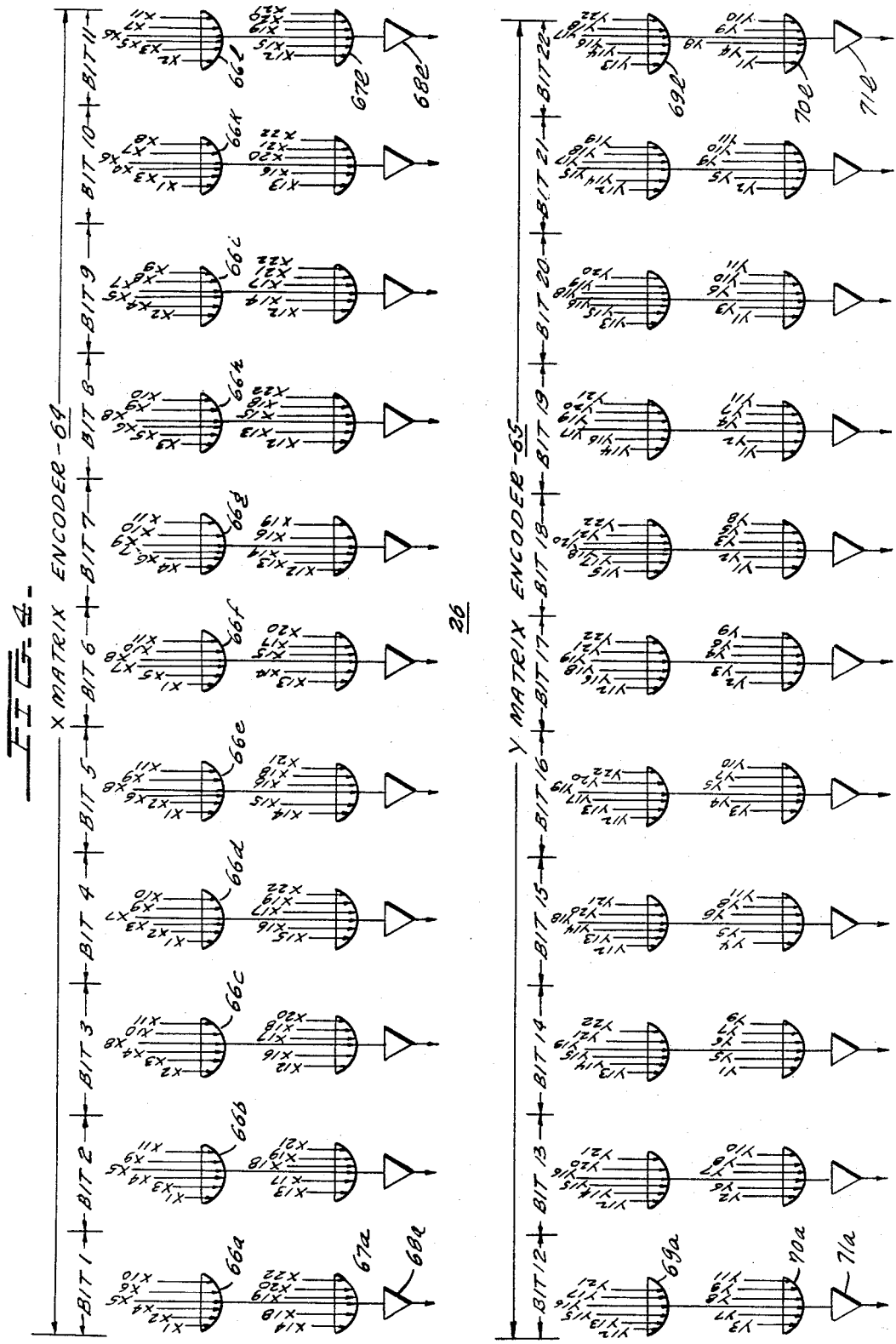

Referring now to the drawings, FIGURE 1a shows a master station 10 which is coupled to a plurality of remote or slave stations 11a–11d. While four slave stations are shown in FIGURE 1a, it should be understood that any desired number of slave stations may be utilized. The master station 10 is shown as being connected in common through the main bus 12, to all of the slave stations so that any transmit request emitted by master station 10 is simultaneously received by all of the remote stations 11a through 11d. It should be understood that any communication media may be employed with the supervisory control system of the instant invention, and the system is thereby utilizable with radio links, microwave links, private wire links, to name just a few.

The block diagram of the master station 10 is shown in greater detail in FIGURE 1, and is comprised of tone or link equipment 13 which normally includes tone transmission and tone reception means for respectively transmitting and receiving data at the master station. In the case of tone reception equipment, received signals from the slave stations are demodulated and transmitted through output 13a to the receiving interlock circuit 14. The receiving interlock circuit 14 is provided with means for converting the incoming demodulated signals from a first form into a second form suitable for facilitating the processing of data. In the case of the instant invention, the data received is transmitted in the non-return-to-zero form (NRZ), and is converted by the receiving interlock means into the return-to-zero (RZ) form. Data bits appear at the output 15 and are inserted into a receiving register 18. Shift pulses are generated at output 16 of the receiving interlock circuit 14 in order to load the register means 18. The receiving interlock circuit 14 also generates parity, and upon the loading of every fourth bit into the receiving register 18, output 19 initiates an inspect parity signal to determine whether the last received character meets parity.

As soon as the receiving register 18 is fully loaded, a register full signal appears at output 20 which is impressed upon the receiving interlock circuit 14, line counter 21, and memory write control 22. The register full signal operates receiving interlock circuit 14 in order to control a reset of register 18. The register full signal is further impressed upon the line counter 21 which operates to count the number of lines of data which the remote station on line has transmitted.

The register full signal appearing at output 20 is also impressed upon a memory write control circuit 22, which is comprised of suitable gating means, selectively enabled by the outputs 21a of line counter 21 so as to control at its outputs 22a what display locations the data appearing at outputs 20a of receiving register 18 should be placed. In the case of parity failure, receiving interlock circuit 14 generates a parity failure signal on line 14b. This signal is impressed upon the memory write control 22, controlling the outputs 22a to cause an error lamp to be energized as part of the data display of either display 23 or 24. Electrical displays are represented by the telemeter memory and display 23 and status memory and display 24. The display 23 may take the form of a decimal display controlled by the binary output of receiving register 18 to visually display a numeric reading in decimal form. Typical display means utilized in such instances are commonly referred to as Nixie tubes. Any other suitable visual display means, however, may be employed.

Status memory and display means may be simply comprised of a bank of red and green lamps with a red and a green lamp associated with each point to be displayed to indicate either an ON or an OFF alarm condition.

The master station is further provided with a control panel 25 which is comprised of suitable means for addressing any particular remote point within the system in order to obtain telemetry from the remote point or to perform either a raise-lower or close-trip operation at the particular point desired.

The control panel 25 is typically provided with a bank of buttons or other suitable manual actuating means, each being identified with a particular remote point. As one example, considering FIGURE 1b, a section of a typical panel is shown. The panel section shown shows pushbuttons for points No. 1 through 4 for remote station No. 1, and the master raise-lower trip, and closed buttons, respectively. If, for example, it is desired to perform a trip operation for point No. 3, the No. 3 and the master trip button would be depressed. Other combinations would be performed in a like manner.

When such a selection is made, the binary code for addressing the desired point is developed by the output terminals 25a comprising the instruction addresses which, in turn, are impressed upon the encoding gate circuitry 26. This circuitry is comprised of a plurality of gates which are so enabled by the outputs 25a from the control panel 25 so as to connect selected ones of its outputs 26a upon a transmission register 27 which is basically a register means which receives a coded instruction in parallel form, and is adapted to transmit the coded instruction in serial form at its output line 27a to the input of the tone or link equipment circuit 13. As previously mentioned, the tone or link equipment 13, for the transmission phase of a system cycle, is normally comprised of tone transmission equipment of either the phase, frequency or amplitude-type which employs the outgoing data as the modulating means for the carrier generated by the tone equipment.

When control over a remote point is desired, the pushbuttons of control panel 25 also set up output signals at 25b which are impressed upon a radial link interlock circuit 28 which selectively energizes certain of its outputs 28a for the purpose of enabling the link selection gates 29 so as to choose the link 29a, 29b or 29c over which the transmitted data is to be sent.

When link selection request signals are impressed upon radial link interlock 28, it simultaneously devolps an output at 28b which is impressed upon the control interlock circuit 30 and the interrogation interlock circuit 31. The interrogation interlock circuit 31 normally controls the master station during its quiescent state of operation by sequentially developing interrogation addresses at its outputs 31a as well as sequentially developing link selection requests at its outputs 31b. An address is changed from one remote station to another when an end-of-scan signal appearing at the output 14a of receiving interlock circuit 14 is impressed upon interrogation interlock circuit 31. When the control requested signal from output 28b is impressed upon interrogation interlock circuit 31, this coupled with an end-of-scan signal from output 14a, generates a begin transmission signal at 31b so as to enable the transmission control circuit 32 which, in turn, supplies shift pulses at 32a in order to serially step out the instruction word stored in transmission register 27 into the tone or link equipment circuit 13.

When the instruction word has been fully stepped out of transmission register 27, this is an indication that the instruction word has been fully transmitted, and a register empty signal is developed at the output 27b of register 27. This is impressed upon the control interlock circuit 30 which also receives a confirm signal from the output 13b of tone equipment 13. The confirm signal originates at the remote station which is addressed and indicates that the transmission has been received and successfully decoded. Both the register empty and the confirm signal must be received by the control interlock circuit before the execute enable signal appearing at 30b is developed in the control panel 25. This means that the raise or lower push-button does not receive energy until receipt of a confirm signal at the master station, coupled with the fact that a register empty signal has also been received by the control interlock circuit 30.

The register empty signal appearing at output 27b also exercises control over the control panel 25 by means of the address enable output 30a which prevents an address from being inserted into the transmission register 27 until the completion of a scan at the remote station being scanned at the time that manual control over the master station is desired.

In the case of a raise or lower operation, the depression of the master raise or master lower button develops an output at 25c which is passed through the control interlock circuit 30 and appears at its output 30c as an execute command which is sent out as a predetermined tone frequency by the tone or link equipment 13.

In the case where an instruction order has been transmitted, and no manual control is to be exerted thereafter, the register empty signal coupled with the absence of any further manual control request causes the control interlock circuit 30 to develop an output at 30d which disables the transmission control circuit 32 so as to prevent any further operation of transmission register 27. The removal of a control request from the control interlock circuit 30 and interrogation interlock circuit 31 permits the quiescent state of operation, i.e., the sequential interrogation operation of the master station to resume until the occurrence of the next control request.

FIGURE 2 shows a block diagram of a typical slave station 11 which is comprised of input terminals 41 which would be coupled to one set of the link terminals 29a, 29b or 29c of the master station shown in FIGURE 1. The coded instruction word transmitted to the remote station is impressed upon tone or link equipment circuit 42 which is comprised of demodulation means for the receive operation as well as modulation means for the transmit operation. Coded instructions, however, are demodulated by circuit 42, the output appearing at 42a and being impressed upon the shift pulse interlock circuit 43 which converts the modulated information from the NRZ to the RZ form as previously described, with bit decision outputs appearing at outputs 43a, shift pulse outputs appearing at 43b and the loading element reset signal appearing at 43c, respectively. The operation is such that when a coded instruction is received, bits appear at 43a and are shifted into the receive register 44 by virtue of the shift pulse appearing at 43b. When the register is filled, an output at 44a is developed preventing shift pulse interlock circuit 43 from controlling the receiving register 44. The instruction code, when fully loaded into receiving register 44, and after being processed by the receiving register 44 in a very unique manner to be more fully described, places its output at 44b upon decoder means 45 which is comprised of logic gates which interpret the coded instructions of the receive register so as to identify the point address at its output 45a and the type of control or information desired from the point. The outputs 45b through 45e identify whether a trip, close, raise or lower operation, respectively, is to be performed, while the output 45f establishes whether a select telemeter request has been made.

Once a coded instruction has been properly decoded, the output at 45a and one of the outputs from 45b through 45e are impressed upon a control action interlock circuit 46 which couples the control action at its output 46a to the particular point over which control is to be exerted. Simultaneously therewith a signal is developed at output 46b which is impressed upon tone transmission equipment of circuit 42 to generate a tone confirming the fact that a decoded instruction has been received and decoded as a valid instruction. In the case of either a trip or close operation, the control action occurs simultaneously with the transmission of the confirm signal. In the case of a raise or lower operation, after transmission of the confirm signal, this enables the master station to transmit the execute command which is transmitted and received by the remote station as an execute tone which appears at output 42b of tone equipment 42, and is impressed upon the control actions interlock circuit 46 to exert a raise or lower control over the addressed point.

When a trip, close, raise or lower operation is to be performed, these functions are all impressed upon OR gate logic circuit 47 so as to develop either a trip-close or raise-lower output at 47a or 47b, respectively, to control the scanner control circuit 48. This causes output to appear at 48a controlling the scanner circuit 49 to scan all of the points associated with remote station 11 and to place this information appearing at its output 49a upon a parity generator circuit 50. Simultaneously therewith, upon the transmission gate circuit 51, the output of transmission gate circuit 51 appears at 51a and is simultaneously impressed upon the OR logic circuit 52 and parity generator circuit 50. The operation is such that data signals are impressed upon parity generator circuit 50 from the output 49a, and when predetermined signals are impressed upon circuit 50 from the output 51a, the parity generator circuit impresses its parity bit through 50a upon the OR logic 52 and then becomes reset to generate parity for the next group of binary data bits. Thus, each group of data bits is transmitted through 51a and OR logic circuit 52 and its output 52a to the tone transmission circuit 42. After each group of binary data bits, the parity bit is inserted which passes through output 50a, OR logic circuit 52 and its output 52a to the tone transmission equipment.

The scanning control circuit 48 receives an output 49b from the scanner circuit 49, indicating that a full tour has been completed, i.e., that all points associated with remote station 11 have been scanned. This causes the scanner control circuit 48 to enable the scanner 49 for a subsequent scan. The total number of scans desired may be selected, depending only upon the needs of the user. Let it be assumed, however, that five full scans are desired. Scanning control circuit 48 will thereby keep account of the total number of completed tours, and when the scanner control circuit 48 registers the fact that five tours have been completed, an output is developed at 48b indicative of the fact that the scanning period is ended, in order to release the scan control circuit 48 from the control of the control action interlock circuit 46.

In the case where a select telemeter request has been made by the master station, the outputs 45f of decoder 45 are impressed upon a select telemeter interlock circuit 53 which is comprised of logical gates receiving digital input information at its input terminals 53a and analog input information at its input terminals 53b. The select telemeter request establishes which of the digital and/or analog outputs the master station desires to receive information from. In the case of digital information, a particular input or particular inputs to the select telemeter interlock circuit 53 are coupled through the outputs 53c to the transmission gate circuit 51. Since telemeter information from either digital or analog inputs are already provided with an accompanying parity bit, this information is transmitted through output 51a and OR logic circuit 52 directly to the tone or output equipment 42.

In a case where a selected analog input or analog inputs are to be transmitted to the master station, the output of select telemeter interlock circuit 53 at 53d is impressed upon an analog-to-digital converter means 54 which digitizes the analog output and impresses the digital output appearing at 54a upon the transmission gate circuitry 51.

During quiescent operation, the remote station has its scanner 49 enabled to run through a full scan of alarm points as well as telemetry points so that every point associated with the remote station 11 has its status transmitted to the master station. As part of its scan conversion request signals and telemeter request signals are generated at 49c and 49d, respectively, in order to enable the analog-to-digital converter 54 and the select telemeter interlock 53, respectively, when the information from these points is to be transmitted as part of the total scan from the remote station 11.

FIGURE 3 is a schematic diagram showing the manner in which the control push-buttons of the control panel are connected. FIGURE 3 shows a portion of the panel board 25 comprising the trip 50, close 51, selective telemeter 52, raise 53, and lower 54 push-buttons, respectively. Since the trip, close and selective telemeter buttons 50 through 52, respectively, are substantially identical, only one such push-button will be described herein for purposes of simplicity. The trip push-button 50 is comprised of a manually operable button 50a, which, when depressed downwardly, shown by arrow 55, establishes connections across the terminals 56 through 58, respectively. The left-hand terminal pair 58 is coupled through a bus 59 to a B— source. The opposite terminal of terminal pair 58 is coupled to the link selection output terminal 60.

The other terminal pairs, namely terminal pairs 56 and 57 couple the x and y characters outputs 61 and 62, respectively, to bus 63 which is coupled to the enabling output signal from the control interlock circuit 30 in a manner to be more fully described in order to supply power to the x and y characters outputs.

In order to provide a large number of combinations of outputs, a binary cyclic code arrangement is employed in the system of the instant invention. In the coding arrangement of the instant invention, a 22-binary bit coded instruction is transmitted from the master station to the slave station. This 22-bit instruction word is broken up into two portions comprised of bit 1 through bit 11 which is designated as the x characters and bit 12 through 22 which is designated as the y characters. Thus, the x characters are at least 11 in number as are the y characters 11 in number. FIGURE 1c shows the binary make-up of the x characters $x_1$ through $x_{11}$. It can be seen that each x character contains six binary one bits, and five binary zero bits in a predetermined arrangement. It should further be noted that the $x_2$ character may be generated from the $x_1$ character simply by shifting the $x_1$ coded character one bit position to the left, and moving the left-handmost bit of the $x_1$ character into the right-handmost position for the $x_2$ coded character. This shifting operation is designated by the diagonally aligned arrows shown between the $x_1$ and $x_2$ coded characters in FIGURE 1c. In a like manner, the coded characters $x_3$ through $x_{11}$ are developed in the same identical manner. It will be noted that in shifting the coded $x_{11}$ in the same manner, the result will be to develop the coded character $x_1$. Thus, by the development of a single coded combination comprised of six binary ones and five binary zeros, and by shifting this code around within the bit positions 1 through 11, it is possible to derive 11 different combinations.

Considering the $y_1$ coded character and comparing this character bit for bit against the $x_1$ coded character, it can be seen that the $y_1$ character is the complement of the $x_1$ character. In other words, for each position of the $x_1$ character which is binary one, the associated position in the $y_1$ character is binary zero. Thus, whereas the $x_1$ coded character contains six binary one bits and five binary zero bits, the $y_1$ character contains six binary zero bits and five binary one bits. The development of the $y_2$ character from the $y_1$ character is performed in the same way as previously described such that the bits of the $y_1$ character are shifted one position to the left with the left-handmost binary bit of the $y_1$ character becoming the right-handmost binary bit of the $y_2$ character. It can be seen that this shifting operation develops each of the characters $y_3$–$y_{11}$ and by shifting of the $y_{11}$ character in the same manner as above described, this will yield the $y_1$ character.

By splitting the coded instruction of the 22 bit length into two separate 11 bit lengths wherein 11 different combinations for each section of the coded instruction are available, this yields a total of 121 combinations for the 22-bit instruction word. The total number of combinations is further enhanced by taking the complement of the $x_1$ through $x_{11}$ characters so as to develop the characters $x_{12}$ through $x_{22}$. It should be noted that these complement characters $x_{12}$ through $x_{22}$ are substantially identical in format to the characters $y_1$ through $y_{11}$. In a like manner, the complement of the characters $y_1$ through $y_{11}$ may be taken developing the characters $y_{12}$ through $y_{22}$, respectively. The possible combinations then become $x_1$ through $x_{22}$ with $y_1$ through $y_{22}$ or a total of 484 different combinations. Thus, through the use of the 22-bit instruction code provided herein, 484 distinct addresses may be generated.

The manner in which the cyclic code is employed at each remote station will be more fully described.

FIGURE 4 shows the encoding gate circuit 26 of the master station 10 of FIGURE 1, and is comprised of an x-matrix and y-matrix encoder 64 and 65, respectively, with the inputs $x_1$ through $x_{22}$ being selectively impressed upon the OR gates 66a through 66L and 67a through 67L comprising x-matrix of encoder 64. The outputs of these OR gates are impressed upon the D-C amplifiers 68a through 68L, respectively, the outputs of these amplifiers, in turn, being connected to the inputs of the transmission register 27 of FIGURE 1 and to be more fully described.

The x-matrix encoder 65 is comprised of the OR gates 69a through 69L and 70a through 70L, respectively, which selectively receive the inputs $y_1$ through $y_{22}$. The outputs of these OR gates are impressed upon the D-C amplifiers 71a through 71L, respectively, with the outputs of the amplifiers being impressed upon the transmission register 27, to be more fully described. The actual x inputs, $x_1$ through $x_{22}$ and $y_1$ through $y_{22}$ may be wired to the push-buttons of the control panel in any desired manner. For example, the control panel may be provided with 484 push-buttons representing 484 individual addresses. For address 1, depression of push-button 1, for example, push-button 1 of FIGURE 1b, the code generated may be the $x_1$ and $y_1$ code. For point No. 2, the code generated may be the $x_2$ and $y_1$ codes. For point No. 3, the code generated may be the $x_3$ and $y_1$ codes, etc., until all 484 combinations are each associated with a particular address. Any other suitable arrangement may be provided.

Before power is coupled to the $x$ and $y$ characters, i.e., before these coded instructions may be loaded into the transmitting register 27, the link selection operation must first be performed. As previously mentioned, by depression of the trip button 50a shown in FIGURE 3, the link selection output terminal 60 is coupled to B— through the bus 59. This trip button will be associated with one particular slave or remote station, thereby transferring power from the control panel 25 to the radial link interlock circuit 28 shown in FIGURE 1, and shown in greater detail in FIGURE 5. The radial interlock circuit 28 of FIGURE 5 is comprised of the bi-stable flip-flop circuits 72 through 76 having their set inputs coupled to the control buttons of FIGURE 3 associated with each remote station or slave station to the address. For example, let it be assumed that the buttons 50 through 54 shown in FIGURE 3 are all associated with remote station No. 1. Depression of any of these buttons, therefore, couples the link selection output 60 to the set input 72a of bi-stable flip-flop 72 causing its output 72b to go to binary one. The other bi-stable flip-flop circuits 73 through 76 having all been reset at their reset input terminals 73c through 76c, respectively, by a general reset signal appearing at bus 77 have their output terminals 73b through 76b remaining at the binary zero level. The state of its output circuit OR gate 78 provides a binary one signal at its output which is coupled through a D-C amplifier 79 to provide the control requested signal which the output 28b of the radial link interlock 28, which, in turn, is impressed upon the control interlock 30 and the interrogation interlock circuit 31.

The outputs 72b through 76b of radial link interlock circuit 28 are coupled to the link selection gate 29, shown in FIGURE 5, which is comprised of a plurality of AND gates 80 through 84, each having one of its input terminals connected to the outputs 72b through 76b, respectively, and having its other input terminal connected to the common bus 85 which is coupled to the interrogation interlock circuit 31 and receives a binary one signal therefrom when the normal or quiescent state is to be interrupted so as to enable the master station to transmit a coded instruction to the slave station.

The outputs of AND gates 80 through 84 are coupled to associated inputs of each of the OR gates 86 through 90, shown in FIGURE 5, which couple the selective link to one of the D-C amplifiers 91 through 95, respectively, thereby linking the master station to one specific remote or slave station in a manner to be more fully described.

The link selection gating circuitry 29 is further comprised of the AND gates 96 through 100, respectively, each having one of their inputs coupled to the common bus 101 which is connected to the interrogation interlock circuit 31 and is in binary one state during a normal interrogation cycle; that is, during the quiescent operation of the system. The other inputs of AND gates 96 through 100 are coupled to the interrogation interlock circuit 31 which further acts to indicate which link the master station is to be connected to during the quiescent operation. Thus, during quiescent operation, the common bus 101 will be in binary one state acting to enable the gates 96 through 100 so that one of the links will be selected by means of the interrogation interlock circuit 31 coupling one of the AND gates 96 through 100 through its associated OR gate from the group of OR gates 86 through 90 and its associated group of D-C amplifiers 91 through 95 in order to enable the receiver-transmitter circuitry 13 shown in FIGURES 1 and 6 of the instant application.

Let it be assumed that the system is in a normal interrogation cycle. Thus, considering FIGURE 5, bus 101 will be in binary one state and one of the remote stations will be selected so that one of the AND gates 96 through 100 will be enabled. Let it be assumed that the AND gate 96 is enabled to couple the master station to the slave station which are linked to one another by link No. 1. This causes a binary output through OR gate 86 and D-C amplifier 91 at 91a to the transmitter half 102 of the receiver-transmitter circuit 13, shown in FIGURE 6. The receiver half 103 of circuitry 13 is also shown in FIGURE 6. Thus, with the output 91a of D-C amplifier 91, shown in FIGURE 5 as being binary one, this places the binary one upon the input of inverter 104a and one input at AND gate 105a. Since the remaining outputs 92a through 95a of D-C amplifiers 92 through 95, respectively, are binary zero, this places a binary zero state upon the inputs to inverters 104b through 104e, respectively, and to the AND gates 105b through 105e, respectively. The AND gates 105a through 105e are coupled through a common bus 106 to the output of the phase shift keying modem which generates the signal to be transmitted by a phase shift modulation arrangement. For example, since only one of the AND gates 105a through 105e, namely the AND gate 105a, is enabled, this AND gate couples its output through an OR gate 107a and a buffer circuit 108a into link No. 1. Buffer circuit 108a, as well as buffer circuits 108b through 108e, are impedance matching circuits matching the output of the modem to the link.

Since the output of the D-C amplifier 91 of FIGURE 5 is at binary one, the inverter 104a has its output at binary zero so as not to conflict with the output of the modem passed through the AND gate 105a and the OR gate 107a. In the case of the inverters 104b through 104e, since each of these gates receive a binary zero signal, all of their outputs are binary one, thus coupling a steady D-C signal through their associated OR gates 107b through 107e, respectively, and buffer circuits 108b through 108e, respectively, to the respective links 2 through 5, thereby clearly establishing the fact that no phase shift transmission is being attempted through links 2 through 5 while link 1 is transmitting. Any of the other links 2 through 5 may be coupled to the modem in a similar fashion, it being understood that only one link may be coupled to the master station at any given instant.

The outputs of the D-C amplifiers 91 through 95 of FIGURE 5 are further coupled to respective inputs of the AND gates 109a through 109e, thus enabling only one of the AND gates 109a through 109e, the other inputs of these gates being connected to the tone or receiver equipment for each link. The outputs of AND gates 109a through 109e are all coupled through OR gate 110 to the receiving interlock circuit 14 so that the demodulated data received from the slave station may then be examined.

The transmitting register 27 of FIGURE 1 is shown in greater detail in FIGURE 7, and is comprised of a plurality of bi-stable flip-flop circuits 111a through 111y, coupled in the manner shown in FIGURE 7 to form a shift register. The set inputs of bi-stable flip-flop stages 111b through 111m are connected respectively to the outputs of D-C amplifiers 68a through 68L of the $x$-matrix encoder. The set inputs of bi-stable flip-flop stages 111n through 111x are connected to the outputs of D-C amplifiers 71a through 71L, respectively, of $y$-matrix encoder 65, shown in FIGURE 4, the shift input 112 of flip-flop stages 111a through 111m, as well as the shift input 113 of stages 111n through 111y which are adapted to receive shift input pulses in order to shift the coded instruction located within transmitting register 27 of the last flip-flop stage 111y to the modem of the tone transmission equipment. It should be noted that the first bi-stable flip-flop stage 111a is coupled to receive a binary one input at its first set input stage and a binary zero input at its remaining set input stage so that when a coded instruction is inserted into the transmitting register, and when this instruction is shifted out of the register 27, in its place each upper output terminal of each bi-stable flip-flop circuit is replaced by a binary one state. Thus, when the coded instruction stored in transmitting register 27 is fully shifted out of the transmitter register, the output terminals 114 through 134 and 136 will all be in the binary one state which is indicative of the fact that the transmitting register 27 has completely unloaded, and hence transmitted a coded instruction. It is this state which determines the time at which a coded instruction may be loaded into the transmitting register 27 during the manual interruption operation of the master station quiescent state.

Considering again the example wherein the push-button at a particular point is depressed while a B— signal is provided for the link selection terminal 60, as shown in FIGURE 3, the $x$ and $y$ character outputs 61 and 62 of FIGURE 3 do not receive power immediately upon depression of the control panel push-button. Power is withheld until it is clearly established that the transmitting register 27 is not in the process of transmitting a coded instruction. This determination is performed by the push-button power control circuit 137 forming a part of the control interlock circuit 30 shown in FIGURE 8 of the instant application. The push-button power control circuit 137 is comprised of four AND gates 138 through 141, respectively, having their inputs coupled to the outputs 114 through 134 and 136, respectively, of the transmitting register 27, shown in FIGURE 7. The outputs for these gates are connected to the D-C amplifiers 142 through 145, respectively, having each of their outputs coupled to AND gate 146. The output of AND gate 147 is coupled through D-C amplifier 147 to an inverter circuit 148. Thus, when a coded instruction has been fully unloaded from the transmission register 27, all of the AND gates 138 through 141 will be binary one, causing the output of AND gate 146 to be binary one, establishing binary one at the output of D-C amplifier 147 and binary zero at the output of inverter circuit 148.

The control interlock circuit 30 is further comprised of a transmission sequence circuit portion 149 having a bi-stable flip-flop 150 controlled at its set input by an AND gate 151 and at its reset input by a general reset signal impressed at 150a. When the general reset is impressed on bi-stable flip-flop 150, its output 150b is impressed upon one input of AND gate 153, the other input of which is coupled to the output of D-C amplifier 147. Thus, after a general reset and after a coded instruction has been fully unloaded from the transmission register 27, AND gate 153 will go to binary one at its output 153a which is coupled to the common bus 63 of FIGURE 3 indicative of the fact that encoding power is thereby granted to the $x$ and $y$ matrix encoders 64 and 65 of FIGURE 4, allowing the coded instruction to be loaded into stages 111b through 111x of transmitting register 27.

As soon as this coded instruction is loaded into the transmitting register, a number of the outputs 114 through 134 and 136 will change from a binary one state to a binary zero state, causing at least one and possibly more of the AND gates 138 through 141 of FIGURE 8 to have their outputs go binary zero. This means that the output of AND gate 146 will become binary zero, establishing binary zero at the output of D-C amplifier 147 and binary one at the output of inverter circuit 148. Binary zero at the output of D-C amplifier 147 inhibits AND gate 153, preventing any encoding power from reaching the push-buttons at this time. The binary one output of inverter circuit 148 is impressed upon one input of AND gate 151, and this binary one condition will remain until the transmitting register 27 again fully unloads the coded instruction which it now contains. The other input of AND gate 151 is received from the interrogation interlock circuit 131, and this input terminal will receive a binary one state when a control mode has been established. This, in turn, will cause the output of AND gate 151 to go to binary one causing the output 150c of bi-stable flip-flop 150 to become binary one.

As soon as the coded instruction contained in the transmitting register 27 is fully unloaded, the output of the D-C amplifier 147 will go to binary one. This condition is impressed upon one input of AND gate 152, the other input of which is coupled to the output 150c of flip-flop 150. Thus, when the output of AND gate 152 goes to binary one, this is indicative of the fact that a control transmission cycle has taken place and that the coded instruction for the control transmission cycle has been successfully transmitted.

Returning to FIGURE 5, it will be recalled that once a push-button from the control panel has been depressed requesting either a trip, close, selective telemeter, raise or lower operation, respectively, one of the links of the total group of links is selected which, in addition to operating the link selection gates of FIGURE 5, also develops an output at 28b of the D-C amplifier 79, which in the binary one state is indicative of the fact that a request is being made. This control request is impressed upon the control request signal input terminal 154a which is the set input terminal of flip-flop 154 provided in the interrogation interlock circuit 31 shown in FIGURE 9. The control request causes output terminal 154c of flip-flop 154 to go binary one, and causes output 154d to go binary zero. These outputs are impressed upon the AND gates 155 and 156, respectively, the other inputs of which receive an end-of-scan signal which is derived from the receiving interlock circuit 14 of FIGURE 1, and to be described in greater detail subsequent hereto. It is sufficient to understand that the end-of-scan signal will be in binary one state when a full scan at a slave station has been completed. Thus, in the instant example, when the scan has been completed and a control request signal has been generated, AND gate 156 will develop a binary one output which is coupled to the input of flip-flop 158. Assuming that a master reset of flip-flop 158 has occurred, the output of AND gate 155 causes output 158a to go binary zero, and output 158b to go binary one. The binary one output is passed through emitter follower 160, and the output of emitter follower 160 is simultaneously impressed upon the AND gate 151 of FIGURE 8 to establish the fact that a control mode is the present state of the master station. A signal is also impressed upon one input of the OR gate 161 which is impressed upon the trigger input of a one-shot multivibrator 162 which generates the negative square pulse 164 at its output 162a. The trailing edge of this negative square pulse is the begin transmission output 31b which is shown as being developed by the interrogation interlock circuit 31 of FIGURE 1, and is impressed upon the set input terminal 165a of bi-stable flip-flop 165 forming the transmit control circuit 32 shown in FIGURE 9, and also shown in the diagram of the master station of FIGURE 1. This causes the output 165b of bi-stable flip-flop 165 to go binary one in order to trigger the controlled free-running multivibrator circuit 166 into operation. Thus, a continuous train of pulses appear at the output 166a and are coupled through the Darlington emitter followers 167 and 168 to shift pulse inputs 112 and 113 of transmitting register 27, shown in FIGURE 7. Thus, when the transmit request develops at the output of the interrogation interlock circuit 31, the transmitting register is unloaded by means of the transmission control circuit 32. The delay provided by the one-shot multivibrator 162 of interrogation interlock circuit 31 of FIGURE 9 assures the fact that the transmitting register 27 has been fully loaded before unloading of the coded instruction takes place.

As the transmitting register 27 of FIGURE 7 becomes fully unloaded, the output of the D-C amplifier 147, shown in FIGURE 8, will go to the binary one state, as previously described. This, coupled with the fact that output 150c of bi-stable flip-flop 150 is binary one, causes AND gate 152 to go binary one, thus generating binary one at the output of AND gate 152 at the output 152a of AND gate 152 which is impressed upon the set input terminal 165c of bi-stable flip-flop 165 in transmission control circut 32, shown in FIGURE 9, so as to trigger the control free-running multivibrator 166 to terminate its operation since the coded instruction has been successfully transmitted.

When a coded instruction has been transmitted, it will be processed by these slave stations in order to establish whether the coded instruction received is valid and whether it represents a particular point at the remote station. Assuming that the coded instruction passes this test at at least one remote station and that the coded instruction proves to be a valid one, the slave station will transmit a tone confirming the fact that a valid coded instruction has been received and decoded. This tone will be a tone different from any other transmission from the slave to the master station and will enable a tone receiver attuned to that particular tone. When that tone is received by the specific tone receiver 13', shown in FIGURE 8, a confirm tone receiver output will be developed which is impressed upon one input of AND gate 171 forming the control confirm portion 170 of the control interlock circuit 30. The other input of AND gate 171 is derived from the output 152a of AND gate 152, shown in FIGURE 8, which is binary one when a control transmission has been successfully completed, which description was given previously. When these two signals are in binary one state, AND gate 171 impresses binary one upon the set inputs of bi-stable flip-flop 172 so that its outputs 172a and 172b go to binary zero and binary one states, respectively. Since the binary zero state of flip-flop 172 is chosen as ground potential, it should be noted that a 12-volt difference will appear across lamp driver 173 and lamp 174, causing the confirm lamp 174 to light, indicating successful receipt of a confirm tone. Simultaneously therewith, the output 172b of bi-stable flip-flop 172 goes to binary one and is coupled through a Darlington emitter follower having an output terminal 175a to the common bus 66, shown in FIGURE 3, which is coupled to the raise-lower push-buttons 53 and 54 in order to provide power for the duration control output terminal 66a which, in turn, is impressed upon the input terminal 177 of the control reset circuit portion 176 of control interlock circuit 30, shown in FIGURE 8.

Thus, when a raise or lower operation has been requested and the control tone has been received from the appropriate slave station, the power for the duration control 66a of the raise and lower buttons 53 and 54 of FIGURE 3 is then established, and so long as either the raise or lower button 53 or 54 is depressed, power is supplied to input 177 which is simultaneously impressed upon one input of each of the OR gates 178 and 179 of FIGURE 8. Output 178a of OR gate 178 is directly coupled to one specific tone transmitter within the tone equipment circuit 13, which tone is, in turn, transmitted to the slave station to indicate that the raise or lower operation is to continue as long as that specific tone persists.

In order to protect against the depression of either the raise or lower button for too long a period of time, the binary one output of flip-flop 172, shown in FIGURE 8, acts as a trigger input to the controlled free-running multivibrator 180 whose output 180a is impressed upon the first stage 181 of a four-stage counter comprised of stages 181 through 184, respectively. It will be assumed that the counter has undergone a general reset through the button 185 and its reset input terminals. Assuming now that the multivibrator 180 is now triggered into the ON state, as soon as this counter develops binary one at its outputs 181a through 184a, respectively, these binary one states will be coupled through the emitter followers 185 through 188, respectively, to the respective inputs of AND gate 189.

When the AND gate 189 has all of its inputs at binary one, its output will go to binary one and be coupled to one input 190a of OR gate 190, shown in FIGURE 8, which will trigger one-shot multivibrator 191 into operation causing a reset of the flip-flop stages 181 through 184 at the trailing edge of the negative square pulse appearing at the output 191a of one-shot multivibrator 191. The output of OR gate 190 also appears as a general reset at 190a which is also employed as the reset input pulse at input 150a of bi-stable flip-flop 150 in the transmission sequence circuit 149 of FIGURE 8.

The function served by the counter comprised of flip-flop stages 181–184 can thereby be seen to protect against too length a depression of the raise or lower buttons. By resetting the circuit after a predetermined time, the length of the counter, i.e., the duration which it is designed to protect, may be chosen in any manner depending only upon the needs of the system. Thus, either a raise or lower operation will have a duration dependent either upon the length of time which the raise or lower buttons 53 or 54 of FIGURE 3 are depressed, or at the outside limit as being dependent upon the time duration provided for by the four-stage counter of control interlock circuit 30 of FIGURE 8. The specific timer employed depends only upon the choice of the user and it should be noted that any suitable timing means may be substituted for the exemplary embodiment described herein.

In the case where a trip or close operation is to be performed and the confirm tone has been received, the master trip or master close push-buttons 192 or 193, respectively, shown in FIGURE 8, are depressed providing a binary one output at 194 which is coupled into the trigger input of the one-shot multivibrator 195 of FIGURE 8, thereby transmitting a brief execute tone controlled through the output of OR gate 178 and causing the inverter 196 and, hence, the one-shot multivibrator 197 coupled to the output 195a of multivibrator 195 through OR gate 179, to develop the trigger pulses as shown adjacent these devices, thereby causing the AND gate 198 to develop a negative square pulse at its output 198a, which in turn is passed through input 190b of OR gate 190 to appear as the general reset pulse at terminal 190c, and further acting as the trigger pulse for one-shot multivibrator 191 to reset the four-stage counter comprised of stages 181–184 in the same manner as previously described.

If, for any reason, a false operation of the manual control attempt occurs, the master station may be reset by means of depressing the manual reset button 199, shown in the control interlock circuit 30 of FIGURE 8. This impresses a binary one state at input 190d of OR gate 190 establishing a general reset output at terminal 190c, and further causing reset of the counter stage through the one-shot multivibrator 191 in the same manner as previously described.

In the case of quiescent operation of the master station, the interrogation interlock circuit 31 of FIGURE 9 plays the major role in obtaining such operation. Upon completion of receipt of a master reset at 190c, this master reset is impressed upon the reset input of bi-stable flip-flop 158 of FIGURE 9, causing the emitter follower outputs 159 and 160 to go to binary one and binary zero, respectively. This removes the control mode status from the output to emitter follower 160 and invokes the sequence of interrogation mode at 159a which, in turn, is impressed upon the bus 101, shown in the link selection circuit 29 of FIGURE 5, thus causing the gates 96 through 100 to be enabled. Since the output of emitter follower 160 of FIGURE 9 is at binary zero, the link selection circuit 29 of FIGURE 5 is disabled, thus placing the link selection gates in operation for normal cycle interrogation.

The binary one state of output terminal 159a which is triggered to monostable multivibrator 163 causes a positive square pulse at its output terminal 163a, which is coupled through OR gate 157 to a one-shot multivibrator 200 whose outputs 200a and 200b generate the negative and positive square pulses, as shown. Output 200b triggers the input 201a of a bi-stable flip-flop 201 which, together with bi-stable flip-flop stages 202 and 203, form a three-stage counting circuit, the outputs of which 201b through 203b and 201c through 203c are selectively coupled to the input terminals of the AND gates 204 through 209, respectively. The output 200a of one-shot multivibrator 200 is connected to the bus 210 which is, in turn, connected to one input terminal of each of the AND gates 204 through 209. Whatever count is established in the three-stage counter has its count increased by one thereby causing one of the AND gates 204 through 209 to have its output enabled. The outputs of AND gates 205 through 209 are impressed upon the respective inputs of OR gate 210 so that this binary one condition is passed through the OR gate and through a D-C amplifier 211, and is connected through its output 211a to one input of OR gate 161, shown in FIGURE 9, which places a binary one condition upon the trigger input of one-shot multivibrator 162, which enables the transmission control circuit 32 in the same manner as previously described, as well as inserting binary one bits into the set input terminals of flip-flop stages 111a and 111y of transmitter register 27, shown in FIGURE 7. The purpose of inserting these bits will best be understood from a description of the operation of the slave stations which will be set forth subsequently.

The particular count in the three-stage counter comprised of flip-flops 201 through 203 in FIGURE 9 which enables one of the AND gates 205 through 209 causes one of these AND gates to regenerate a binary one state upon an associated one-shot multivibrator 212 through 216, respectively. One of these one-shot multivibrators develops an output trigger which is, in turn, coupled to code forming logic circuits of the type shown by the x-matrix encoder 64 and y-matrix encoder 65 of FIGURE 4 in order to develop an instruction code to be loaded into the transmitting register 27 to identify the next remote station to be addressed. The transmission of the coded instruction will occur in the same manner as previously described, and once connection with the slave station is effected and the slave station transmits all of its data through the master station, an end-of-scan signal will be developed at the inputs to AND gates 155 and 156, shown in FIGURE 9, in the same manner as previously described, since the sequential interrogation mode signal 159 has reset bi-stable flip-flop 154 so that its output 154b is binary one, and its output 154c is binary zero. This enables AND gate 156 causing it to pass a binary one condition through OR gate 157 in order to trigger one-shot multivibrator 200. This causes the counter comprised of stages 201 through 203 to advance its count by 1, thereby selecting another AND gate from the group 204 through 209, and enabling one of the trigger circuits 212 through 216, respectively, causing another remote station to be contacted. In the case where a full count is collected in the register comprised of stages 201 through 203, AND gate 204 will become binary one at its output, causing a general reset of the three-stage counter. Thus, all remote stations within the supervisory control system are automatically and continuously contacted in order to enable them to update all data for which points are associated therewith.

Thus the coded data in RZ form is coupled through terminal 218a to the set input terminal 221a of bistable flip-flop 221 comprising the loading stage of receiving register 18 shown in FIGURE 1, and shown in greater detail in FIGURE 11. The receiving register 18 is comprised of a loading stage 221 and of bistable flip-flop stages 222–234, which stages are coupled in the manner shown, in order to load in an incoming data word by means of shift pulses impressed upon the shift input terminal 222a–234a of each stage which is coupled to the common shift pulse bus 235. The register 18 is reset by means of a reset pulse impressed upon the reset input terminals 222b–234b, respectively, which is coupled to the reset inputs by the common bus 236.

Returning to FIGURE 10, the output data pulses which have been converted to RZ form and which appear at the output terminals 218a are impressed upon the set input terminal 237a of a set biased bistable flip-flop 237. A set biased flip-flop is so designed that if a reset pulse is impressed at the reset input terminal 237b substantially simultaneously with a pulse at the set input terminal 237a that the set input pulse will predominate causing the flip-flop 237 to be controlled by the pulse at the set input as opposed to the pulse at the reset input. The data pulses impressed upon the set bias flip-flop 237 cause the flip-flop to change state upon the occurrence of each binary one condition for the purpose of generating a parity bit based on the incoming data.

The triggering of the controlled free-running multivibrator 219 at output 217c of bistable flip-flop 217 not only causes the incoming data to be converted to RZ form through the AND gate 218, but also couples its output 219a to the set input 240a of bistable flip-flop 240. The first positive square pulse output from the controlled free-running multivibrator 219 at its output terminal 219a causes the outputs 240b and 240c of flip-flop 240 to go to binary zero and binary one, respectively. Output 240c is coupled to one input of AND gate 241. The other input of AND gate 241 is coupled to output terminal 219b of the free-running multivibrator so as to pass pulses which are 180° out of phase with the data pulses passed by AND gate 218. This is true since the outputs 219a and 219b of the free-running multivibrator are in opposite states at any given instant. Thus, when its output 219a goes to binary one AND gate 218 is enabled and AND gate 241 is disabled. When the free-running multivibrator changes its states, output 219a goes to binary zero and 219b to binary one, causing AND gate 218 to be disabled and AND gate 241 to be enabled. Thus, shift pulses only occur after a data pulse has been passed by AND gate 218.

The output of AND gate 241 is simultaneously impressed upon the pulse-AND-gate circuits 242 and 243 with the output being impressed upon the pulse input terminals 242a and 243a, respectively. The purpose of the pulse-AND-gates 242 and 243 coupled with the bistable flip-flop 244 is for the purpose of controlling the shifting in of the data word into the receive register 18 of FIGURE 11, for a purpose to be more fully described. For the present, it is sufficient to understand that as each data bit is received it is loaded or shifted in to receive register 18. In the embodiment of the instant invention each group of four data bits and associated therewith a parity bit, which added to the four data bits, provides an even parity count. Once a parity check has been performed at the master station receiving facility, the need for the parity bit disappears so that the circuitry of the instant invention prevents the parity bit from being shifted into the receive register 18 so that when the receive register 18 is fully loaded it contains a start bit and three-four-bit characters or a total of 13 bits, with the parity bits for the three coded characters having been prevented from being loaded into the receive register. The shift pulses are normally generated at the output terminal 245a of the Darlington emitter follower 245 coupled to the output of pulse AND gates 243. This shift pulse is omitted after each parity bit is loaded into the loading flip-flop element 221 of receive register. The output of AND gate 241, in addition to being coupled to the pulse inputs of pulse AND gates 242 and 243, respectively, is also coupled to the trigger input 246a of a one-shot multivibrator 246. The output terminal 246b of one-shot multivibrator 246 generates a positive square pulse which is coupled to the reset input 221b of loading element 221 of receiving register 18, shown in FIGURE 11. Thus, after each bit is received in loading element 221 it is shifted into receive register 18 by the shift pulse output at terminal 245a of FIGURE 10. However, when parity bits are loaded into the loading element flip-flop 221, the shift pulses removed at this given time by circuitry to be more fully described, and thus by clearing the loading element flip-flop 221 by means of one-shot multivibrator 246, no parity bits are loaded into the receiving register 18.

The manner in which the parity check is performed is as follows:

As was previously described, the first, or start bit, transmitted from the slave to the master station is always a binary one bit followed by the data bits. As was previously mentioned, the design of the system described herein is such as to be capable of transmitting coded characters of four binary bits coupled with a parity bit. The incoming information is shifted in such a manner that the start bit is inserted into the loading element flip-flop 221; is shifted into the first stage 222 of the receive register 18 and the loading element 221 is then reset in the same manner as previously described. Thus, the start bit is now contained in first stage 222. The operation continues with the first data bit being loaded into the loading element 221 and then simultaneously shifted into the first stage 222, while the start bit is shifted into stage 223.

The loading and shifting operation continues in this manner until the start bit reaches flip-flop stage 226 of receiving register 18. When the start bit reaches this stage this is indicative of the fact that four data bits are contained in the stages 222–225, respectively, and therefore, that the parity bit is now being loaded into the loading element stage 221. Since the start bit is always binary one, the output 226a of stage 226 goes to binary one and this binary one state is impressed upon the trigger input terminal 247a of one-shot multivibrator 247. This causes its output terminals 247b and 247c to form the negative and positive going square pulses as shown. The positive going square pulse is impressed upon one input of AND gate 249. The trailing edge of the negative square pulse is applied to the set input of bistable flip-flop circuit 248. However, before this set input pulse is impressed upon the bistable flip-flop, this flip-flop has been reset by a general reset pulse impressed upon its reset input terminal 248b. Thus, its output terminal 248c goes to binary zero. Before it can go to binary zero its binary one output coupled with the positive square pulse output from one-shot multivibrator 247 causes AND gate 249 to become open to a binary one signal from its output terminal 249a upon one input terminal of the OR gate 250, shown in FIGURE 10 of the instant application and forming a part of the receiving interlock circuit 14. This binary one state is passed by OR gate 250 and D.C. amplifier 251 to the trigger input of one-shot multivibrator. The output terminal 252a develops a negative going square pulse as shown so that its trailing edge is employed to trigger the trigger input terminal of one-shot multivibrator 253. The delay provided by the one-shot multivibrator 252 insures the fact that the parity generating flip-flop 237 has indeed processed the four binary bits and the parity bit associated therewith.

The output of one-shot multivibrator 253 is impressed upon one input of AND gate 239, the other input of which is coupled to the output of the parity bit generating flip-flop 237 through the emitter follower 238. The AND gate 239 is designed to be enabled whenever parity has failed and to be disabled whenever parity is successful. This is performed by virtue of the bistable flip-flop 237. When the flip-flop 237 undergoes a reset, its output 237b goes to binary zero. The first binary one presented to its set input terminal 237a causes its output 237b to go to binary one. A second binary one input will cause output 237b to go to binary zero, while a third binary one input will again cause output 237b to go to binary one. Thus, it can be seen that any odd number binary ones will cause output 237b to go to binary one while an even number of binary one inputs cause the output terminal 237 to go to binary zero. The transmitting means of each slave station is so designed as to generate an even parity count, thus whenever an even parity count is developed in the flip-flop 237 its output will be binary zero. This disables the AND gate 239 whose output 239a is coupled to the set input 254a of bistable flip-flop 254, shown in FIGURE 10 and forming part of the receiving interlock circuit 14. The reset input terminal 254b triggers the flip-flop after a general reset state so as to place its output 254c in binary one state. Upon the occurrence of an even parity output from parity generating flip-flop 237 AND gate 239 fails to impress a binary one state upon the set input 254a of flip-flop 254. Assuming now that a parity failure occurs, output 237b of flip-flop 237 goes to binary one and since AND gate 239 is enabled by the output of the one-shot multivibrator 253 at this check time, this binary one state sets flip-flop 254 so that its output goes to binary zero, which state is impressed upon one input of AND gate 255 which provides the write signal directing the received incoming line of information into the appropriate storage means. When the output 254c of bistable flip-flop 254 goes to binary zero this write pulse is withheld, preventing the received line of data from being written into the display or storage device.

The next parity check occurs when the start pulse is loaded into stage 230 of receive register 18, shown in FIGURE 11, causing its output 230a to impress a positive square pulse upon the trigger input terminal 256a of one-shot multivibrator 256, shown in FIGURE 11. The one-shot multivibrator 256 operates in conjunction with the bistable flip-flop circuit 257 and the AND gate 258 in the same manner as the multivibrator 247, bistable flip-flop 248 and AND gate 249 go immediately to the left of elements 256–258 in order to provide an output pulse which is impressed upon one input of OR gate 250 indicative of the fact that the parity bit for the second four-bit coded character is now in the loading element 221 of receiving register 18. The output terminal of AND gate 258a of FIGURE 11 is coupled into one input of OR gate 250 which, after a delay enables the AND gate 239 which will pass a binary one state if the second parity check fails.

In a like manner, the third and final parity check for a line of data is performed when the start bit is located in the last stage 234 of receive register 18 with the output of this stage being coupled to the trigger input of one-shot multivibrator 267. Its output 267a develops a positive going square pulse which is coupled into the remaining input of OR gate 250, shown in FIGURE 10 to perform the final parity check operation. If any of the three parity checks fail to produce an even parity count, the AND gate 239 of FIGURE 10 will become binary one at this time, causing the set input 254a of binary flip-flop 254, shown in FIGURE 10, to receive a binary one state and setting its output 254c to binary zero. This operation withholds the write pulse from the output terminal 255a of AND gate 255. This operation thereby withholds the writing of a received line of data if any one of the three parity checks fail.

As was previously described, the parity check bits themselves, which are received at the loading element flip-flop 221 are not loaded into the receiving register 18. The circuit for performing this function is comprised of the pulse AND gates 242 and 243 and the bistable flip-flop 244. The operation of this circuit is as follows:

When the first parity check operation is about to begin, the output of one-shot multivibrator 253 goes to binary one state, placing a reset input pulse upon the reset input terminal 244d of bistable flip-flop 244. This places a binary one state at output 244b and the binary zero at output 244c. The next pulse output from AND gate 241 is simultaneously impressed upon the pulse input of pulse AND gates 242 and 243. Since the output terminal 244c of flip-flop 244 is at binary zero, the pulse AND gate 243 will fail to provide a pulse at its output thereby failing to pass a pulse on its output terminal 245a to the shift pulse, bus 235 of receive register 18 showing in FIGURE 11.

The output terminal 244b of bistable flip-flop 244 is, however, in binary one state and this fact coupled with the positive pulse at the pulse input of pulse AND gate 242 causes a pulse to be developed at the output 242b of pulse 242, providing a set input pulse for bistable flip-flop 244. This sets output 244c in binary one state. However, the setting for output 244c in the binary one state occurs too late for the pulse impressed at 243a so as to prevent the passage of a shift pulse at that time. However, the next output pulse from AND gate 241 which is simultaneously impressed upon pulse AND gates 242 and 243 will be passed by the output of pulse AND gate 243 so as to provide a shift pulse for the receive register 18.

The output from AND gate 241 which is simultaneously fed to the one-shot multivibrator 246 erases the parity bit from the loading element stage 221 of register 18, shown in FIGURE 11, in readiness for the next succeeding bit of information to be loaded. The operation of the receiving register is, load in the start bit and four code bits, load the parity bit into the loading element long enough to perform the parity check operation, skip a shift pulse, erase the parity bit and then load the next four code bits into the register. Subsequent steps just continue the cycle.

Once a complete line of data which is comprised of three four-bit coded characters pulse a start bit is fully loaded into register 18, the output 234a of last stage 234 develops a binary one state, which is impressed upon the trigger input terminal of one-shot multivibrator 258, shown in FIGURE 10, which develops a negative square pulse as shown at its output terminal 258b. The one-shot multivibrator, in turn, triggers the one-shot multivibrator 259 so as to develop the negative and positive square pulses at its output terminals 259a and 259b, respectively. Output terminal 259b is coupled to one input of AND gate 255 in order to produce the write pulse at the time at which the data line is fully loaded into the receive register 18, i.e. a predetermined delay after the start pulse reaches the last stage 234 of register 18.

Output terminal 259a of one-shot multivibrator 259 is coupled to the reset input terminal of bistable flip-flop 254 to place its output 254c at binary one in readiness for the next line of data to be received. Output 259a is also simultaneously coupled to the reset input bus of flip-flops 248 and 257 shown in FIGURE 11 and the reset input bus 236 of receiving register 18 which is coupled through the Darlington emitter follower 261.

When the start bit reaches the last stage 234 of receiving register 18, its binary one output is further coupled to the set input of line counter 262 forming part of the receiving interlock circuit 14 shown in FIGURE 10. The line counter 262 is comprised of four binary flip-flop stages 263–266, respectively, which are coupled in such a manner as to form a cumulative count of the total number of lines received in the receive register 18. As each start bit reaches the final stage 234 of receive register 18 the count in the line counter 262 is increased by one.

Once a slave station is signalled by the master station to initiate transmission it begins such transmission by sending a code format which precedes the lines of data. Code format is a coded instruction having twelve bits preceded by a start code of a predetermined code configuration which is chosen for its uniqueness and which will in any case be different from any line of data to be received by the receiving register. This predetermined format sets up the output terminals of the stages 232–233 of register 18 in a predetermined code combination such that the AND gates 267 and 268, shown in FIGURE 10 and forming part of the receiving interlock circuit 14, will produce a binary one at the input of AND gate 269 only upon receipt of this code format. The receipt of the predetermined code format, coupled with the fact that a start bit has been loaded in the final stage 234 of register 11, causes AND gate 269 to impress a binary one state upon the one-shot multivibrator 270 whose output 270a generates a negative square pulse as shown. The trailing edge of the negative square pulse is passed by the emitter follower 271 to the reset input bus 272 which, in turn is coupled to the reset input terminals 263a–266a of the flip-flop stages 263–266 forming the line counter 262. Thus the predetermined code format transmitted from the slave station to the master station indicates that the slave station is about to transmit all of the data associated with the slave station, causing the line counter 262 to be reset to its zero status.

When such a supervisory control system is installed the format of the data transmitted from a slave station to the master station follows a predetermined arrangement. Thus the master station knows what the identity of data will be as it is received and can route the data so received to the appropriate place. For example, let it be assumed that each slave station will transmit 13 lines of data, the first 11 lines of data will be supervisory data regarding remote points. Since each line contains 12 data bits and there are 11 lines, there will be 132 points yielding supervisory data. Let it be assumed that the 12th and 13th lines constitute telemetry data, meaning that each four-bit group of binary bits represents one code character and since there are three four-bit groups per line of data, six telemetry characters will be received. At the end of this period of time a reset, or last line of slave transmission signals should be generated. Once the first word code format of the slave station is received and the line counter 262 is reset to zero, each line received by the receiving register 18, once fully loaded into the register, will cause the line counter 262 to increase its count by one for each receive line. As soon as the 11th line is received and loaded the AND gate will go to binary one state into the manner in which it is connected to the output of stages of line counter 262 indicating that the 11th line of supervisory data has been received and that the data following it will be telemetry data. The telemetry data indication is provided for by the AND gate 274 which is selectively coupled to the outputs of line counter 262 to provide a telemetry indication.

When all 13 lines of the slave station have been received, AND gate 275 will go to binary one; its output terminal 275a is coupled to the reset input terminal 240d of bistable flip-flop, shown in FIGURE 10, causing its output terminals 240b and 240c to go to binary one and binary zero, respectively. Output terminal 240c, in going to binary zero, blocks any shift pulses from reaching receiving register 18. Output 240b in going to binary one, places a reset input pulse upon the input terminal 217d of bistable flip-flop 217, causing its outputs 217b and 217c to go to binary one and binary zero, respectively. The zero output at 217c shuts off control free-running multivibrator 219. The binary one output at terminal 217b is impressed upon one input of AND gate 276, the other input of which is connected to the output of one-shot multivibrator 259. AND gate 276 has its output 276a go to binary one when the end of scan signal has been received and when the register filled signal has been received after a predtermined delay. This provides an indication to the interrogation interlock circuit 31 of the control portion of master station 10, shown in FIGURE 1, requesting that a new remote station be signalled in order to transmit the data located at that station.

The outputs of line couner 262 are further wired to the inputs of a binary coded decimal-to-decimal conversion circuit 277. The circuit 277 is designed so as to produce a binary one at only one of its outputs 277–1 through 277–10 at any given instant, depending upon the condition of the line counter 262. Thus, when line counter 262 has a binary coded decimal count of one, output 277–1 of circuit 277 will be binary one. The other conditions are developed in a similar manner.

The outputs of binary coded decimal-to-decimal circuit 277 are coupled to the display control gate circuits shown in FIGURE 12. The circuitry of FIGURE 12 comprise the gates employed for both the telemeter memory and display and the status memory and display circuits 23 and 24, shown in FIGURE 1. In the arrangement of FIGURE 12 which assumes there are five remote stations, each remote station is provided with a bank of AND gates 278–282, respectively. Each bank has 11 AND gates 278–1 through 278–11, to 282–1 through 282–11 for station number 5, respectively. Considering the bank of AND gates 278 for station number 1, for example, there is provided a common bus 283 which is coupled to one input of all the AND gates 278–1 through 278–11. This common bus is coupled to the output 91a from the link selection gate circuit shown in FIGURE 5 and is in binary one state when slave station number 1 is coupled to the master station.

A second common gus 284, which is coupled to another one of the inputs of AND gates 278–1 through 278–11 is coupled to the white signal output terminal 255a, shown in FIGURE 10. The remaining input terminals of AND gates 278–1 through 278–9 are coupled to the binary outputs of binary coded decimal-to-decimal circuit 277, shown in FIGURE 10. The remaining input of AND gate 278–10 is coupled to the output of AND gate 273, shown in FIGURE 10, while the remaining input of AND gate 278–11 is coupled to the output of AND gate 274, shown in FIGURE 10. Thus, when the link selection gates indicate that slave station number 1 is coupled to the master and when a write pulse has been received, each line of alarm point data is sequentially coupled to the control panel lamps which are enabled by the AND gates 278–1 through 278–9, respectively. Upon receipt of the supervisory data, AND gate 278–10 enables the display of the supervisory information. Upon receipt of the telemetry data, AND gate 278–11 enables the display of the telemeter data. The operation of the remaining display control gates for the stations 2–5 operate in a similar fashion. Once a full cycle has occurred, that is in which all stations 1–5 have transmitted their data to the master, this cycle will be repeated continuously and will be halted only upon interruption from the manual control which takes place in the manner as previously described.

REMOTE STATION-RECEIVER

As previously described with regard to the remote station block diagram, shown in FIGURE 2, incoming coded instructions from the master station are demodulated and impressed upon the shift pulse interlock circuit 43, which is shown in greater detail in FIGURE 13 of the instant application. The demodulated data is impressed upon the set input terminal 284a of bistable flip-flop 284, as well as one input of AND gate 285. The start bit of a received coded instruction, always being in binary one state, triggers the output 284b to binary one, getting the controlled free-running multivibrator 286 into operation at a speed twice the transmission bit rate. The output 286b of the free-running multivibrator is coupled with the incoming data pulses of the NRZ form to produce pulses at output 285a of the RZ form. A first positive output of the free-running multivibrator 286 appearing at 286b is impressed upon the set input of bistable flip-flop 287, moving its output 287a to binary one, placing this enablement signal at one input of AND gate 288. The remaining output terminal 286a of the free-running multivibrator 286 is coupled to the remaining input of AND gate 288, developing shift pulses at its output 288a which are employed for shifting coded instructions into the slave station receiving register 44 of FIGURE 2, to be more fully described. The shift pulses are impressed through the Darlington emitter follower 289 and 290, to be impressed upon the remote station receiver. The output 288a of AND gate 288 is also impressed upon the trigger input terminal of one-shot multivibrator 291 which develops a negative square pulse as shown at its output 292. The trailing edge of this pulse is provided for the purpose of resetting the loading element of the receive register substantially in the same manner as previously described with respect to receive register of the master station.

The receive register 44 of the slave station is shown in FIGURE 2 and is also shown in greater detail in FIGURE 14. The receiving register 44 is comprised of a loading element flip-flop stage 293, as well as first and second register portions 294 and 295 comprised of register stages 296–306 and 307–318, respectively. The receiving register is further comprised of the gating circuits 319, 320, 321 and counter 322.

The operation of the slave station receiving register is as follows:

As coded instructions are received from the master station and demodulated and then converted from NRZ to RZ form, bit pulses are impressed upon the set input terminal of the receiving register loading element stage 293a from the output of AND gate 285, forming part of the shift pulse interlock circuit of FIGURE 13. Shift pulses are provided at the output of AND gate 288 of FIGURE 13 and are impressed upon the shift pulse inputs 296a–306a of register portion 294 and 307a through 318a of register portion 295.

The output terminals 293a and 293b of the loading element stage 293 are coupled to one input of each of the AND gates 323 and 324. Assuming that the register portions 294 and 294a of receiving register 44 have been appropriately reset through the reset input buses 335 and 336 which are coupled to the reset inputs of each of the stages 296–318, all of the outputs 296b–318b of stages 296–318, respectively, will be in binary one state. The output 318b of the last flip-flop stage 318 is coupled to one input of each of the AND gates 323 and 324. Thus, before a coded instruction is fully loaded into register 44, output 318 is binary one, enabling AND gates 323 and 324. This thereby couples the output terminals 293a and 293b of loading element 293 through AND gates 323 and 324, respectively, and OR gates 327 and 328, respectively, to the input terminals 296c and 296d of the first stage 296 of register 44.

Considering the gating circuitry 320, it will be noted that output terminal 318b of last stage 318 is coupled to one input of each of the AND gates 329 and 330, thus enabling these two AND gates. The other inputs of these AND gates are coupled to the output terminals 306b and 306c of the right-handmost stage 306 of register portion 294. When the register is less than fully loaded, AND gates 329 and 330 are enabled, coupling the output terminals 306b and 306c respectively, through AND gates 329 and 330 and OR gates 333 and 334, respectively, to the input terminals 307c and 307d of the first stage 307 of the register portion 295. Thus, at the time when the receiving register is less than fully loaded, loading element 293 is coupled to the left-handmost stage 296 of register portion 294 and the right-handmost stage 306 of register 294 is coupled to the left-handmost stage 307 of register portion 295 and thereby forming a single register comprised of a total of 23 stages capable of containing a 22 bit word plus start bit coded instruction.

When the coded instruction is fully loaded into receiving register 44 the start bit reaches the right-handmost stage 318 of register portion 295, causing output 318b to go to binary zero and output terminal 318c to go to binary one. This removes the binary one indication from AND gates 323 and 324 of gating circuitry 319 and AND gates 329 and 330 of gating circuitry 320, respectively and places a binary one state upon the AND gates 325 and 326 of gating circuitry 319 and AND gates 331 and 332 of gating circuitry 320, respectively. Considering first gating circuitry 319, the other inputs of AND gates 325 and 326 are coupled to the output terminals 306b and 306c of right-handmost stage 306 of register portion 294, these outputs being coupled through OR gates 327 and 328, respectively, to the input terminals 296c and 296d of the left-handmost stage 296 of register portion 294.

Thus the register portion 294 closes upon itself forming a closed ring register.

Considering the gating circuitry 320 AND gates 331 and 332 being enabled from output 318c, enable these AND gates passing the other input terminals which are connected to the outputs 317b and 317c of stage 317 of register portion 295 through OR gates 333 and 334, respectively, to the input terminals 307c and 307d of left-handmost stage 307 of receiving register portion 295. Thus, register portion 295 closes in upon itself to form a closed ring register.

As will be recalled, the master station through the use of the X and Y characters matrices, transmits two 11-bit cyclic code combinations so that when the slave receiving register is fully loaded, the register portions 294 and 295 contain the two 11-bit cyclic code combinations from the X and Y matrices, respectively.

When one of these cyclic code combinations is loaded into a register portion, either 294 or 295, it is possible to employ only one such combination as identifying a specific remote station. Until this cyclic code is properly positioned within the register portion the remote station will fail to identify it as a valid code for the specific station. As will further be recalled, the cyclic code is generated by taking any preceding code and shifting it one position to the left (or right if desired) and taking the bit at the left-hand end (or right-hand end if desired) and making it the right-handmost bit of the next code combination. Thus, if a cyclic 11-bit code is inserted into a closed ring register the code combination may be shifted around until the code combination is identical to the one to which the remote station will respond. By counting the number of shifts required to perform this function, this establishes the exact point which the master station wishes to address. For example, let it be assumed that the master station is transmitting to remote station number 1 and that the X and Y cyclic code combinations are loaded into the receiving register portions 294 and 295, respectively. The total number of shifts which the X and Y cyclic code combinations undergo determine the exact point to be addressed. Since a maximum of eleven shifts are possible per register portion this means that there are a total of 121 combinations. Since the complement of each cyclic code combination may also be transmitted, this increases the total number of combinations to 484, for reasons as previously described. The operation of the register to establish the point to be addressed is performed in the following manner:

Once the coded instruction is fully loaded into the receiving register 44 causing the gating circuitry 319 and 320 to separate register portions 294 and 295 and form closed ring registers, the register fill signal at output 318c is also impressed upon the control input of the controlled free-running multivibrator 337 of gating circuitry 321.

The register filled signal turns the controlled free-running multivibrator 337 into the ON state causing its output 337a to be coupled to one input of each of the AND gates 338 and 339 simultaneously therewith. The register filled signal is also impressed upon the reset input of flip-flop 287 shown in the shift pulse interlock circuit 43 of FIGURE 13. This sets its output 287a at binary zero, disabling AND gate 288 and removing the shift pulses from the receiving register. The other input terminals of AND gates 338 and 339 are derived from the output terminals 340a and 341a of bistable flip-flop circuits 340 and 341, shown in FIGURE 15. It will be assumed at this time that these bistable flip-flops have been reset so that their outputs 340a and 341a are in binary one state. This causes the output of the controlled free-running multivibrator 337 of FIGURE 14 to be passed through AND gates 338 and 339 and OR gates 342 and 343, respectively, to the shift pulse inputs 296a–306a through 307a–318a, respectively, of the receiving register portions 294 and 295, respectively. Thus, even though the shift pulse source of the shift pulse interlock circuit of FIGURE 13 has been disabled, once the receiving register portions 294 and 295 are closed upon themselves, the controlled free-running multivibrator 337 becomes the shift pulse source.

The outputs of AND gates 338 and 339, in addition to being passed by OR gates 342 and 343, respectively, are coupled to the set inputs of counters 322 and 344 of FIGURES 14 and 15, respectively. Counter 322 is comprised of four flip-flop stages 345–348, respectively, and is employed to count the number of times which the binary cyclic code is shift within register portion 294. Counter 344 is comprised of four binary flip-flop stages 349–352 and is employed to count the number of times the binary cyclic code is shifted in register portion 295.

As each shift occurs within the receiving register portions 294 and 295 an examination is made of the cyclic code after every such shift. This examination is performed by the X group of AND gates 353–356, which are affiliated with register portion 295, while the Y group of AND gates 357–360 are affiliated with the register portion 295. The inputs of AND gates 353 and 354 are selectively coupled in a predetermined fashion to the outputs 296b–306b and 296e–306e of register portion 294. The input terminals of these AND gates may be coupled in such a way as to provide a binary one output at 354a of AND gate 354 only when one of the eleven possible combinations occur. As soon as this combination does occur output 354a which is coupled to the input of OR gate 361, shown in FIGURE 15, causes binary one to be passed through OR gate 361 to the set input of bistable flip-flop 340 causing its output terminals 340a and 340b to go to binary zero and binary one, respectively. Output 340a in going to binary zero disables the AND gate 338 of FIGURE 14, preventing any additional shift pulses from entering register portion 294.

Output terminal 340b of FIGURE 15, in going to binary one, is coupled to one input of AND gate 362 of FIGURE 15, conditioning this AND gate for passage of a binary one state. When it receives a binary one at its remaining input terminal which is generated in a manner to be more fully described.

As was previously described, the eleven bit binary cyclic code which may be shifted eleven times to form all possible combinations, may also be presented in complementary form and for this reason the AND gates 355 and 356 of the X characters portion shown in FIGURE 15 are provided to indicate the presence of one of the complementary sequences. Thus, if one of the complementary combination sequences are present, a binary one will appear at the output 356a of AND gate 356 and be coupled through OR gate 361 to the set input of flip-flop 340 again controlling the output terminals 340a and 340b to move to binary zero and binary one, respectively, in turn cutting off shift pulses from register portion 294 and enabling AND gate 362 to be ready to pass a binary one state.

The register portion 295 is also provided with examination gates 357–360, shown in FIGURE 15, which are provided to identify the presence of the Y-coded combination of either regular or a complementary sequence form. When either of these conditions are present the output of either of the AND gates 358a or 360a are coupled through an OR gate 363 to the set input terminal of bistable flip-flop 341 causing its output terminals 341a and 341b to go to binary zero and binary one states respectively. Output 341a in going to binary zero prevents the shift pulses from multivibrator 337 from passing through AND gate 339 thereby preventing any additional shift operations within register portion 295. Output terminal 341b in going to binary one conditions the remaining input terminal of AND gate 362, thus causing this AND gate to pass a binary one state to the common busses 364 and 365 of FIGURE 15.

As was previously mentioned, each time a shift occurs the count of the shift counters 322 and 344 of FIGURES 14 and 15, respectively, is increased by one. As soon as the cyclic code combination for the specific remote or slave station is deciphered in addition to the shift pulses being prevented from passing to the register portions 294 and 295, no additional counts are permitted to be developed within counters 322 and 344. Thus these counters contain the exact count of the number of shift pulses required until the binary cyclic code combination for the specific slave station is contained within these register portions. It should be noted that the number of shifts may differ within the two register portions and these register portion may be shifted independently of one another.

The output terminals of the counters 322 and 344 of FIGURES 14 and 15, respectively, are coupled into binary coded decimal to decimal conversion circuits 346 and 347, respectively. The conversion circuits are so designed that only one of its ten output terminals will be at a binary one state, depending upon the binary coded decimal count within counters 322 and 344. Since there are eleven possible combinations, additional AND gates 368–370 are provided in FIGURE 14 to yield a total of thirteen possible output combinations with the possible combinations being no-count through eleven counts for shifts from zero through eleven and a twelve count indicating that an error has been committed since a total of twelve shifts means that one point has been examined twice which should not be necessary for a proper identification. In a like manner, the counter 344 of FIGURE 15 is provided with the additional AND gates 371–373 to provide a total number of combinations of zero counts through eleven counts, plus a twelveth or error count.

When both counts are complete, the AND gate 362 of FIGURE 15 goes to binary one enabling the AND gate groups 371–381 and 382–392 via the common busses 364 and 365, respectively. The remaining input of each of the AND gates 371–381 is coupled to the outputs C0–C11 and CX which are the outputs of the binary coded decimal-to-decimal circuit and AND gates 368–370, respectively. Depending upon the total number of counts generated by counter 322 of FIGURE 14, only one of the AND gates 371–381 will be enabled.

In a like manner, the count developed by counter 344 of FIGURE 15 is coupled through the binary coded decimal-to-decimal converter 367 and AND gates 371–373 to the remaining inputs of AND gates 382–392, respectively. Depending upon the count developed by counter 344, one of the AND gates 382–392 will have its output go to binary one state.

The outputs of AND gates 371–381 are coupled to the inputs of AND gates 393–403 and 404–414, which bank of AND gates are provided with the common bus inputs 437 and 438 respectively, which are coupled to the outputs of AND gates 354 and 356 which are employed to indicate when a decodable cyclic code combination is presented in the receiving register portion 294. During the normal sequence match common bus 437 will go to binary one. When the normal generating sequence provides a match the common bus 437 is in binary one state causing the AND gate of the group 371–381 which is in binary one state to be passed through its associated AND gate of the group 393–403. In the case where a complement sequence provides the match the common bus 438 will enable the AND gate group 404–414 causing the AND gate from the group 371–381 which is in binary one to be passed through its associated AND gate.

In a like manner the banks of AND gates 415–425 and 426–436 will pass the one state of the AND gate which is in that state from the group of AND gates 382–392. Thus it can be seen that the outputs of the two AND gate banks 393 through 414 produce the X-code combinations X1–X22, while the AND gate banks 415–436 develop the Y-code combinations Y1–Y22. These 44 possible inputs may be employed in any desired combination to generate any one of the 484 possible combinations of points which may be addressed by the master station at any given slave station. One means of utilizing the outputs X1–X22 and Y1–Y22 is to impress them upon a regular core matrix having 22 X-input lines and 22 Y-input lines and thereby being capable of developing any one of 484 possible outputs at the intersection or coincidence between a given X and a given Y line.

Substantially the same function is carried out by the circuitry shown in FIGURE 16 wherein the trip instructions are decoded by the AND gate bank 481 comprised of AND gates 442–460, respectively. Close instructions are decoded by the AND gate bank 461 comprised of AND gates 462 through 480, respectively. Raise instructions are decoded by the AND gate bank 481 comprised of AND gates 482–484 respectively; while lower instructions are encoded by the AND gate bank 485 comprised of AND gates 486–488, respectively.

Considering first the trip AND gate bank 441, the outputs X1–X19 taken from AND gates 393–411, respectively, of FIGURE 15, when coupled to all AND gates of the AND gate bank 41. The common bus 489 of the AND gate bank 441 is coupled to the Y–1 output of AND gate 415 shown in FIGURE 15. Thus upon the occurrence of a Y–1 output and an X1–X19 output, one of the AND gates 442–460 will be enabled.

All of the outputs of AND gates 442–460 are selectively impressed upon the OR gates 490–493 whose output is passed through D.C. amplifier 494, which presents a binary one state at its output 494a indicative of a tripping operation when any one of the AND gates 442–460 is in binary one state.

In a like manner the AND gate bank 462–480 has its common bus 495 coupled to the Y–2 output of AND gate 416 shown in FIGURE 15 such that when the Y–2 output is binary one and any one of the X–1 through X–19 outputs is binary one, one of the AND gates 462–480 will be binary one. Since all of these AND gates are selectively coupled through the OR gates 496–499 when any one of them go to binary one state, this condition will appear as a binary one output at terminal 500a of D.C. amplifier 500, thereby indicating a close operation.

Similarly, in a like manner, the raise decoding gates 482–484 will call for a raise operation when a Y–3 output and either a X–20, X–21 or X22 output is developed. The outputs of the AND gates 482–484 are coupled to the inputs of OR gate 501 and D.C. amplifier 502, thus providing a lower function indication at output terminal 502a. This indication is also passed by OR gate 503 and appears at the output terminal 503a.

In the case of a lower operation, the AND gates 486–488 indicate the presence of such an operation whenever a Y–4 output and either an X–20, X–21 or X–22 output appears these outputs are coupled through OR gate 504 in D.C. amplifier 505 to present a raise function indication at output terminal 505a and are also coupled through OR gate 503 generating an output at 503a when either a raise or a lower function is requested.

The outputs of AND gates 442–460 are further coupled to the relay driver bank 506 shown in FIGURE 16, comprised of a group of 19 relay drivers 507–525, each being series connected with a solenoid 507S–525S so as to operate the associated contact sets 507T–525T of the group of trip contact sets 526.

The AND gate bank 462–480 is coupled through the relay driver circuits 528–546, respectively, which are series connected to the solenoids 528S–546S, respectively, for operating the associated contact sets 528C–546C, respectively.

The raise AND gates 482–484 are coupled to the relay drivers 548–550, which are series connected to the solenoids 548S–550S, respectively, for controlling the associated contacts 548R–550R, respectively. The lower AND gate group 486–488 is coupled to relay drivers 551–553, respectively, which is series connected to solenoids 551S–

553S, respectively, for controlling the associated contacts 551M–553M, respectively. As will be noted from FIGURE 16, the contact sets 526, 547, 556 and 557, respectively, required the closure of the master trip 554, master close 555, master raise 558, or master lower 559 contact sets before the actual operation can be performed.

This function is carried out by the control action interlock circuit 46, shown in FIGURE 17.

When any one of the trip, close, raise or lower operations is decoded, these outputs are impressed upon the associated inputs of OR gate 560 of FIGURE 17, triggering one-shot multivibrator 561 which passes a positive-going square pulse through its output and through OR gate 562 causing the tone or link equipment circuit 42 of FIGURE 2 to transmit a tone back to the master station indicative of the fact that a coded instruction has been received and shown to be a valid one. Once the master station receives this confirmed tone, the execute button is depressed causing the demodulating means within the tone equipment circuit 42 of FIGURE 2 to develop an output which appears at the input bus 563 and is impressed simultaneously upon all of the AND gates 564–567. The other inputs of AND gates 564–567 receive the trip, close, raise, and lower decoding signals (only one occurring at any given instant) causing one of these AND gates to have its output go binary one when the execute tone is received.

Assuming that a trip function signal has been decoded, AND gate 564 goes to binary one presenting a binary one input to one of the terminals of AND gate 570 and also passing a binary one through OR gate 568 triggering one-shot multivibrator 569 to present a positive, narrow square pulse to the other input of AND gate 570. This causes AND gate 570 to generate a relatively narrow positive square pulse output for driving the relay driver 581 which is coupled to the master trip relay 554 shown in FIGURE 16.

If a close function is decoded AND gate 565 goes to binary one presenting a binary one state to one input of AND gate 571 and operating the one-shot multivibrator 569 in the same manner as previously described to present a narrow positive square pulse to relay driver 582 in order to operate the master close relay contact 555, shown in FIGURE 16.

If a raise function is decoded AND gate 566 has its output go to binary one, driving the relay driver 572 which is coupled to the master raise relay 558 shown in FIGURE 16. In a like manner decoding of a lower function will enable AND gate 567 and relay driver 573 to close the master lower contacts 559, shown in FIGURE 16. The master raise or master lower contacts will remain closed for as long a period of time as the execute signal appears on the input bus 563. In order to prevent an execute signal of prolonged length from being impressed upon either the raise or lower contacts, the OR gate 574 is provided, which is coupled through an inverter 575 to the one-shot multivibrator 576 and pulse AND gate 577. When the instruction from the master station to be decoded is fully loaded into the receiving register 44 of FIGURE 14 this presents a binary one condition upon the control input of the free-running multivibrator 585, shown in FIGURE 17. This triggers the free-running multivibrator into operation, causing its output 585a to begin stepping the stages 586–589 of counter 590. When the execute signal is removed from bus 563 of FIGURE 17 the output of OR gate 574 goes to binary zero causing the output of inverter circuit 575 to go to binary one. This condition is coupled through one shot multivibrator 576 and pulse AND gate 577 to one input of OR gate 579, triggering the one-shot multivibrator 580 to develop a negative square pulse at its output 580a and a positive square pulse at its output 580b. The trailing edge of the negative square pulse is impressed upon the reset input terminals of counter stages 586–589, thus causing a complete reset of counter 590. The positive square pulse appearing at output 580b is coupled through the Darlington emitter follower 583 to the reset input terminals 335 and 336 of receiving register 14 so as to reset the register in readiness for receipt of a subsequent coded instruction.

Thus, one manner of resetting the receiving register 44 and the counter 590 is by removal of the execute tone. Another manner of resetting the receiving register and the counter 590 is by coupling the output of the scan control device 48 to be more fully described, into another input of OR gate 579, causing the operation of one-shot multivibrator 580 in the same manner as previously described.

Still another manner of operating the one-shot multivibrator 580 is through the output of one-shot multivibrator 569 which is operative during either a trip or close function causing its output 569a to go to binary one which condition is passed through OR gate 579 to operate one-shot multivibrator 580.

Still another way of operating one-shot multivibrator 580 is by virtue of AND gate 578 which is selectively coupled to certain of the outputs of the counter 590 so that when this counter reaches a predetermined count an automatic reset of the receiving register and counter 590 will occur. Thus, even if the execute tone is received for a time duration longer than the count developed by counter 590, reset of the receiving register and cessation of the raise or lower execute operation will occur in order to prevent raise or lower operations of greater than predetermined time durations in order to protect the equipment controlled by such execute operations.

In the case where a selective telemeter code instruction has been received, the selective telemeter interlock circuit 53, shown in FIGURE 17, has its input OR gate 591 receiving all four possible telemetry addresses, any one of which when present will trigger one-shot multivibrator 592 to simultaneously reset the bistable flip-flop circuits 593–596. Simultaneously therewith the four telemeter selections are impressed upon the set inputs of bistable flip-flops 593–596, only one of these set inputs will be binary one at any given instant when any one of the selective telemeter requests, only four of which are shown as part of FIGURE 17 for purposes of simplicity. Let it be assumed that the address A is the desired address. Thus a binary one will be presented at the trigger input of one-shot multivibrator 592 and at the set input of bistable flip-flop circuit 593. The bistable flip-flops 594–596 will automatically be reset. The bistable flip-flop 593 substantially simultaneously receives a pulse at both its set and reset inputs. Flip-flop 593, as well as flip-flops 594–596 are designed so as to be set biased flip-flops. This means that if a pulse occurs simultaneously at both set and reset inputs the pulse at the set input will control the state to which the flip-flop is set. Thus, even though pulses are simultaneously received at set and reset inputs of bistable flip-flops 593, its output 593a will go to binary one, thereby energizing the relay driver 597 causing the contact pair 597c to move to the close position. This couples the point A' to be addressed through contact pair 597c to the analog-to-digital converter 601 which converts the analog output available at A' to a digital output and couples the digitized output at 601a to the tone or link equipment 42, shown in FIGURE 2, to transmit this data.

SLAVE STATION SCANNING MEANS

The slave station, as was previously described is also capable of automatically transmitting all of its points to the master station during the quiescent operation and this occurs in a routine fashion until a manual control request is made at the master station in an effort to seize control of the supervisory control system. This is performed by the scanner circuit 49, shown in FIGURE 2 and also shown in greater detail in FIGURE 18. The scanner circuit 49 is comprised of an X-direction scan counter 602 and a Y-direction scan counter 603 which are also commonly referred to as bit scanner 602 and line scanner 603, respectively. The X-direction scan counter 602 is comprised of four bistable flip-flop stages 604–607 which derives its input from a controlled free-running multivibrator provided in the scan control circuit 48, to be more fully described. The output terminals of the four flip-flop stages 604–607 are coupled through the binary coded to decimal circuit 608 and AND gates 609–614, the inputs of these circuits being selectively coupled to the counter 602 to develop only one output at any given instant at the terminals 608a–608k and 609a–614a which is a total of sixteen possible combinations which is the maximum possible combinations that a four-stage binary counter may develop. When the X-direction or bit scanner 602 is fully loaded the AND gate 614 generates binary one at its output 614a and this is coupled into the set input terminals 615a of the Y-direction scan counter or line scanner 603 comprised of the four binary flip-flop stages 615–618, respectively. The outputs of the line scanner 603 are selectively coupled to the binary coded decimal-to-decimal circuit 619 and the AND gates 620–622, respectively. Thus, each time the bit scanner generates a count of sixteen, the line scanner 603 increases its count by one. This continues until a count of twelve is developed in line scanner 603, which is recognized by AND gate 622 providing a general reset at its output 622a which causes the line counter 603 to reset. The decimal outputs 608a–608k and 609a–614a of the X-direction scan counter are connected to the bank of twelve AND gate groups 623a–623m, 634a–634m, only the banks 623a–623m, 624a–624m and 634a–634m have been shown for purposes of simplicity, the dash lines being representative of the intermediate gates not presented herein. Considering the first bank of gates, each AND gate 623a–623m has one input coupled to the common bus 635 which, in turn, is coupled to the output 619b or the decimal 1 output of the binary coded decimal-to-decimal circuit 619 of the Y-direction or line scanner 603. Another input of each of the AND gates 623a–623m is coupled respectively, to the outputs 608a–608k and 609a–612a, respectively, which are the decimal outputs of bit scanner 602. The remaining input terminals to AND gates 623a–623m are coupled to the actual point being monitored. These points are simply two-state information points, such as ON, OFF, O.K., CRITICAL, and so forth. Thus the operation is such that line scanner 603 causes the line comprised of AND gates 623a–623m to be enabled. Each AND gate 623a–623m is sequentially enabled by the outputs of the bit scanner 602 causing whatever information impressed upon the remaining terminals of these AND gates to appear at the outputs of the AND gates 623a–623m. This line of data is coupled through the OR gate configuration comprised of OR gates 635–646, which are coupled to the output terminals of the upper half of the AND gate bank 623a–628, respectively, which outputs are then OR'ed through OR gates 647 and 648 and D.C. amplifiers 649 and 650, respectively, into the OR gate 651 to be passed by D.C. amplifier 652 to the input of the parity generator circuit 50, shown in FIGURES 2 and 18, respectively.

The remaining banks of AND gates 629–634 respectively, are coupled through the OR gate group 653–664, respectively, the outputs of which are coupled through OR gates 655 and 656 respectively, to pass through OR gate 651 and D.C. amplifier 652 to the input of the parity generator 50 shown in FIGURE 18. Thus, the operation is such that each line is enabled with the AND gates of each line being consecutively stepped to transmit its data in serial fashion through the OR gate configuration of FIGURE 19 into the parity generator circuit 50, shown in FIGURE 18, and ultimately out through the slave station tone equipment.

The parity generator circuit 50, shown in FIGURE 18, is comprised of OR gate 653 which receives outputs from output terminals 608f, 609a and 614a of the bit scanner 602 shown in FIGURE 18, which pulses will occur every fifth count of the bit scanner counter 602. The output of the AND gate banks and OR gate configuration occurring at terminal 652a, shown in FIGURE 19, is impressed upon the set input of a set biased bistable flip-flop 655. Every four data bits impressed upon the set input terminal 655a of bistable flip-flop 655 cause a parity bit to be developed at its output terminal 655b which is passed through emitter follower 656 to one input of AND gate 659.

OR gate 657 has its input terminals connected to the output terminals 608e, 608k and 613a, respectively, which are outputs of the bit scanner counter circuit 602. These outputs are binary one every fourth count of the counter 602. Thus, after four binary bits are impressed upon the parity bit generating flip-flop 655 the fourth bit enables OR gate 657 and D.C. amplifier 658 to pass the parity bit through AND gate 659, OR gate 660 and D.C. amplifier 661 to its output 661a which is connected to the tone transmitting equipment, designated as block 42 in the slave station diagram shown in FIGURE 2.

The data presented at the input 655a is also simultaneously impressed upon the other input of OR gate 660 which passes the data through D.C. amplifier 661 and its output 661a to the telemetering tone channel in the same manner that parity bits are passed. Thus, after every fourth bit is transmitted a parity bit identifying the parity state of these bits, is transmitted to the master station. Upon the occurrence of every fifth bit OR gate 653 goes to binary one, coupling this state through D.C. amplifier 654 to the reset input of the parity generating flip-flop 655. This resets flip-flop 655 in readiness for generating the next parity count.

As was previously described, in cases where a Raise or Lower operation is to be performed the entire contents of the slave station transmitting is scanned a plurality of times in order to allow the operator at the master station location to observe the change in state in the point being controlled during the time in which the Raise or Lower operation is being executed. This is performed by the scan control circuit 48 shown in FIGURE 18, which is comprised of OR gate 682 which receives the execute tone signal at one of its inputs and the Raise-Lower decoded function signal at its other input to trigger one-shot multivibrator 683, causing its output to generate the negative square pulse shown at 683a. The trailing edge of this negative square pulse triggers one-shot multivibrator 684 which generates a positive square pulse as shown at its output 684a. This pulse controls the set input of bistable flip-flop 685, causing its output 685a to go to binary one in order to turn On the control free-running multivibrator 686. The output of the free-running multivibrator 686a is coupled to the input of the bit scanner 602, shown in FIGURE 18, in order to begin a scan operation. The decoded Raise-Lower function signal is also coupled to the reset input terminals of bistable flip-flops 690 and 691 forming a two-stage counter, as well as being impressed upon one input of AND gate 688 and one input of AND gate 689 through invertor 687. When the Raise-Lower function appears, the two-stage counter formed of stages 690 and 691, resets, AND gate 688 is enabled and AND gate 689 is disabled due to the presence of the invertor circuit 687. At the time that one complete scan has been performed the output of the general reset AND gate 622 shown in FIGURE 18, is coupled to the input terminal 694 simultaneously coupling this binary one state to AND gates 688 and 689. Since AND gate 689 is disabled, nothing happens at its output. Since AND gate 688 is enabled, a binary one state is passed to the two-stage counter formed of stages 690 and 691 so that it increases its count by one. Each time another complete scan is performed, the two-stage counter again increases its count by one. As soon as a total cumulative count of four is developed therein the output 691b of stage 691 goes to binary one passing this state through emitter follower 69a and OR gate 693 into the reset input of bistable flip-flop 685. This causes its output 685a to go to binary zero so as to disable controlled free-running multivibrator 686 from initiating any subsequent scans. It should be understood that any total number of scans desired may be designed into the scan control circuit 48 simply by adding additional stages to the two-stage counter shown in the figure.

When the Raise-Lower function decoded signal is removed, the output of invertor circuit 687 goes to binary one and this, coupled with an end of scan signal at input terminal 694, enables the AND gate 689 causing bistable flip-flop circuit 685 to be reset, thereby disabling controlled free-running multivibrator 686, as well as presenting a binary one output signal at 689a which is impressed upon one input of OR gate 579, shown in FIGURE 17 in order to affect resetting of the receiving register and resetting of the counter 590 shown in FIGURE 17.

It can be seen from the foregoing that the instant invention provides a fully automatic supervisory control system comprised of a master station and a plurality of remotely located slave stations which is designed, during the quiescent operation thereof, to have the slave stations continuously scan all the points associated therewith, transmit this data to the master station, to go OFF line, to permit the next remote station to go ON line and repeat this cycle each time all of the remote stations have been scanned in order to continuously update all of the system data. At any time that a specific control is desired to be exerted over any point located at any remote station within the system, control over the master station may be seized simply by addressing that particular point at the master station control panel. Such seizure of the system automatically conditions the system to complete the last scan which it is in the present state of performing and immediately thereafter link the remote station to the master station, enabling the master station to exert the desired control over the addressed point.

A unique binary cyclic code is employed in the supervisory control system which is automatically generated at the master station and which is decoded at the selected remote station in a very unique receiving register thereby automatically selecting the address point desired at a tremendous reduction in the number of gating circuits needed to perform the decoding function.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Decoder means for identifying a particular point within a bank of data points desired to be addressed by a remote location comprising first and second register means each comprised of N bistable stages; first means for loading incoming signals into said first register means; second means connected to said second register means for coupling said first and second register means; said second means including third means connected to said second register means and responsive to said first and second register means being loaded for disconnecting said first and second register means and electrically connecting said first and second register means upon completion of the loading operation to form closed loop registers; said first means further comprising first and second shift means for shifting the signals in said first and second register means respectively, when said second register means is loaded; first and second counter means connected to said first and second shift means respectively, for counting the number of times the signals in said first and second shift register means are shifted; first and second gating means selectively connected to the stages of said first and second register means respectively, each generating an output upon the occurrence of a predetermined arrangement of signals in said first and second register means representative of the desired data point to be addressed, said first and second gating means output being connected to said first and second shift means respectively, for deenergizing the associated shift means whereby said first and second counter means each contain a count representative of the data point desired.

2. The decoder means of claim 1 further comprising third and fourth gating means coupled to said first and second counter means respectively, for conditioning the selected data point in the data bank to transmit its status.

3. The decoder means of claim 1 further comprising error detection means coupled to each of said counter means for generating an error signal when either said first or second counter means contains a count of at least $(N+1)$.

4. Data gathering means in a supervisory control system for automatically collecting data points in a data bank located at a plurality of remote locations as well as requesting data from a predetermined data point on demand comprising first means for collecting all of the data points from the data bank at each remote location on a continuous basis; manual control means for selecting a predetermined point at one of said remote locations; first gating means for generating a 2N-bit code responsive to the manipulation of said manual control means; second gating means conditioned to select one of the remote locations responsive to the manipulation of said manual control means; register means for storing said 2N bit code; third means responsive to the manipulation of said manual control means for inhibiting the operation of said first means upon receipt of all data points from the remote location transmitting during the manipulation of said manual control means; fourth means responsive to the inhibiting of said first means for establishing a data link between said data gathering means and the selected remote location determined by said conditioned second gating means; said fourth means comprising fifth means for unloading the contents of said register means into the data link.

5. The data gathering means of claim 4 further comprising sixth means responsive to the successful establishment of said data link for enabling said register means to unload its contents into the data link.

6. The data gathering means of claim 5 further comprising seventh means responsive to the receipt of the data for the selected data point for enabling the operation of said first means.

7. The data gathering means of claim 6 wherein said seventh means is comprised of second register means for receiving data from the data point; error checking means connected to said second register means for determining the validity of the received data; fourth gating means connected to said error checking means for enabling said first means when said data is valid.

8. The data gathering means of claim 6 wherein said manual control means is further comprised of second control means for initiating control action over the selected data point when corrective action is dictated due to the nature of the data received from the data point; tone generating means connected to said second control means for transmitting a predetermined tone frequency signal over the data link to exercise control over the data point.

9. The data gathering means of claim 7 further comprising data storage means and display means coupled to said fourth gating means for respectively displaying and storing the valid data.

10. The data gathering means of claim 6 wherein said first gating means is comprised of a first section of logic gates for generating an N-bit cyclic code and a second section of logic gates for generating an N-bit cyclic code which is the complement of the code generated by said first logic gate section.

11. The data gathering means of claim 10 wherein said first register means is comprised of at least two N bistable stages for receiving the coded outputs of said first and second logic gate sections.

12. Receiver means for use in a supervisory control system in which the status of all data points in the data bank of each remote location in the system are gathered at a central data gathering facility comprising: first means responsive to the establishment of a data link between the remote location and the central facility for sequentially transmitting the status of all of the data points in the data bank into the data link; second means connected to said first means for generating an end of message signal; third register means for receiving coded signals transmitted through said data link from said central facility; fourth means responsive to the loading of said third means and said end of message signal for converting said third means into first and second isolated closed loop registers; fifth shift means generating shift pulses coupled to said isolated closed loop registers for circulating the coded signals in said first and second closed loops responsive to loading of said third means; sixth means for counting said shift pulses; seventh means connected to said third means for generating an output upon the occurrence of a predetermined position of the coded signal in said third means, said seventh means output disabling said shift means.

13. The receiver means of claim 12 further comprising eighth means coupled to said counter means for conditioning the selected data point to transmit.

14. The receiver means of claim 13 wherein said eighth means further comprises tone generating means coupled to said seventh means for transmitting an acknowledgement tone frequency signal when said seventh means generates an output signal.

15. The receiver means of claim 12 further comprising eighth means for denoting an error condition when said sixth means contain a count of greater than a predetermined number.

16. The receiver means of claim 13 further comprising means connected to said eighth means for placing the status of the selected data point into the data link in coded fashion.

17. The receiver means of claim 16 further comprising ninth means coupled to said eighth means for generating at least one parity bit which accompanies the coded signals representing the status of the selected data point.

18. The receiver means of claim 16 further comprising ninth means for generating an end of transmission signal following the coded signals representing the status of the selected data point.

19. The receiver means of claim 18 further comprising tenth gating means coupled to said eighth means for conditioning the selected data point to undergo corrective measures.

20. The receiver means of claim 19 wherein said tenth means is further comprised of control tone receiver means coupled to the data link for receiving a predetermined tone control signal to exert corrective control over the data point.

21. The receiver means of claim 20 further comprising timing means coupled to said control tone receiver means for limiting the time duration of the tone control signal.

22. The receiver means of claim 21 further comprising eleventh means connected to said control tone receiver means for enabling said first means to transmit the status of all data points into the data link during the presence of the control tone signal.

23. The receiver of claim 21 further comprising twelfth means connected to said control tone receiver means for disabling said first means upon the termination of said control tone signal.

References Cited

UNITED STATES PATENTS

| | | | |
|---|---|---|---|
| 2,978,680 | 4/1961 | Schulte | 340—172.5 |
| 3,209,332 | 9/1965 | Doersam | 340—172.5 |
| 3,219,802 | 11/1965 | Frank et al. | 235—92 |
| 3,221,309 | 11/1965 | Benchiat | 340—172.5 |

ROBERT C. BAILEY, Primary Examiner.

R. M. RICKERT, Assistant Examiner.